(12) United States Patent
Shiina et al.

(10) Patent No.: US 8,784,260 B2
(45) Date of Patent: *Jul. 22, 2014

(54) CONTINUOUSLY VARIABLE TRANSMISSION

(75) Inventors: Takahiro Shiina, Susono (JP); Akira Murakami, Gotenba (JP); Hiroyuki Ogawa, Susono (JP); Daisuke Tomomatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/997,050

(22) PCT Filed: Dec. 2, 2009

(86) PCT No.: PCT/JP2009/006566
§ 371 (c)(1),
(2), (4) Date: Dec. 9, 2010

(87) PCT Pub. No.: WO2011/067813
PCT Pub. Date: Jun. 9, 2011

(65) Prior Publication Data
US 2012/0244991 A1    Sep. 27, 2012

(51) Int. Cl.
*F16H 15/52* (2006.01)
(52) U.S. Cl.
CPC ..................... *F16H 15/52* (2013.01)
USPC .................. 476/37; 476/38; 476/48
(58) Field of Classification Search
USPC ............ 476/36, 37, 38, 41, 48, 18, 19, 21, 23
See application file for complete search history.

(56) References Cited

U.S. PATENT DOCUMENTS

| 3,049,019 A | 8/1962 | Lapointe et al. |
| 4,730,504 A * | 3/1988 | Kraus .............................. 476/63 |

(Continued)

FOREIGN PATENT DOCUMENTS

| JP | U-62-179458 | 11/1987 |
| JP | U-2-74647 | 6/1990 |

(Continued)

OTHER PUBLICATIONS

International Search Report dated Mar. 9, 2010 filed in International Patent Application No. PCT/JP2009/006566 (with translation).

(Continued)

*Primary Examiner* — William C Joyce
(74) *Attorney, Agent, or Firm* — Oliff PLC

(57) ABSTRACT

A continuously variable transmission having a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, an axial force generating portion which rotates in one direction to generate a first axial force for pushing one of the input member and the output member toward the other and rotates in the other direction to generate a second axial force opposite to the first force, and an opposite axial force transmitting portion for transmitting the second force to the other of the input member and the output member when the axial force generating portion generates the second force.

7 Claims, 6 Drawing Sheets

(56) References Cited

U.S. PATENT DOCUMENTS

| | | | |
|---|---|---|---|
| 5,372,555 | A | 12/1994 | Hibi |
| 5,577,423 | A | 11/1996 | Mimura |
| 6,162,144 | A * | 12/2000 | Haka ............... 476/10 |
| 6,241,636 | B1 | 6/2001 | Miller |
| 6,312,358 | B1 | 11/2001 | Goi et al. |
| 6,616,564 | B2 * | 9/2003 | Shibukawa ............ 475/216 |
| 6,689,012 | B2 | 2/2004 | Miller et al. |
| 7,950,275 | B2 | 5/2011 | Isono |
| 8,287,424 | B2 | 10/2012 | Gu et al. |
| 2007/0167279 | A1 | 7/2007 | Miller |
| 2007/0287577 | A1 | 12/2007 | Miller |
| 2008/0248917 | A1 | 10/2008 | Nichols et al. |
| 2008/0305919 | A1 | 12/2008 | Rennerfelt |
| 2012/0025644 | A1 | 2/2012 | Ogawa et al. |

FOREIGN PATENT DOCUMENTS

| | | |
|---|---|---|
| JP | A-6-17915 | 1/1994 |
| JP | 6-328950 | 11/1994 |
| JP | A-2002-213551 | 7/2002 |
| JP | A-2002-372113 | 12/2002 |
| JP | A-2004-530847 | 10/2004 |
| JP | A-2008-75878 | 4/2008 |

OTHER PUBLICATIONS

Jan. 12, 2010 International Search Report issued in International Patent Application No. PCT/JP2009/006567 (with translation).

Jan. 12, 2010 International Written Opinion issued in International Patent Application No. PCT/JP2009/006567 (with translation).

Dec. 5, 2012 Notice of Allowance and Fees Due issue in U.S. Appl. No. 13/000,426.

* cited by examiner

AXIAL DIRECTION

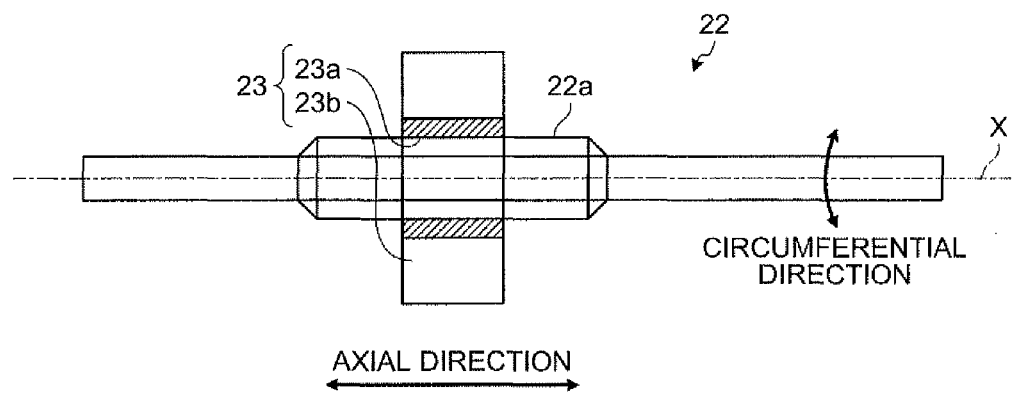
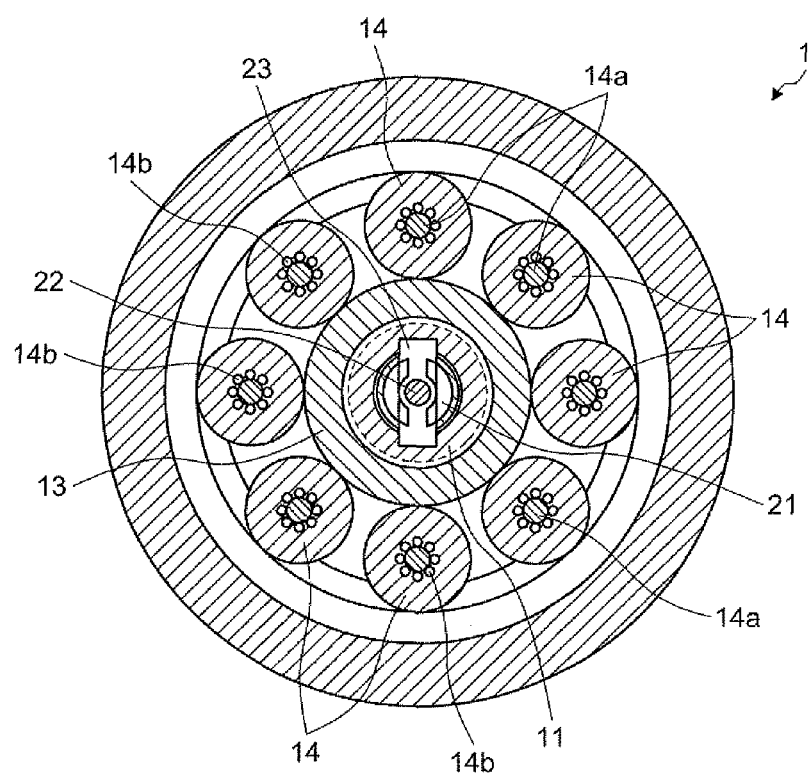

AXIAL DIRECTION

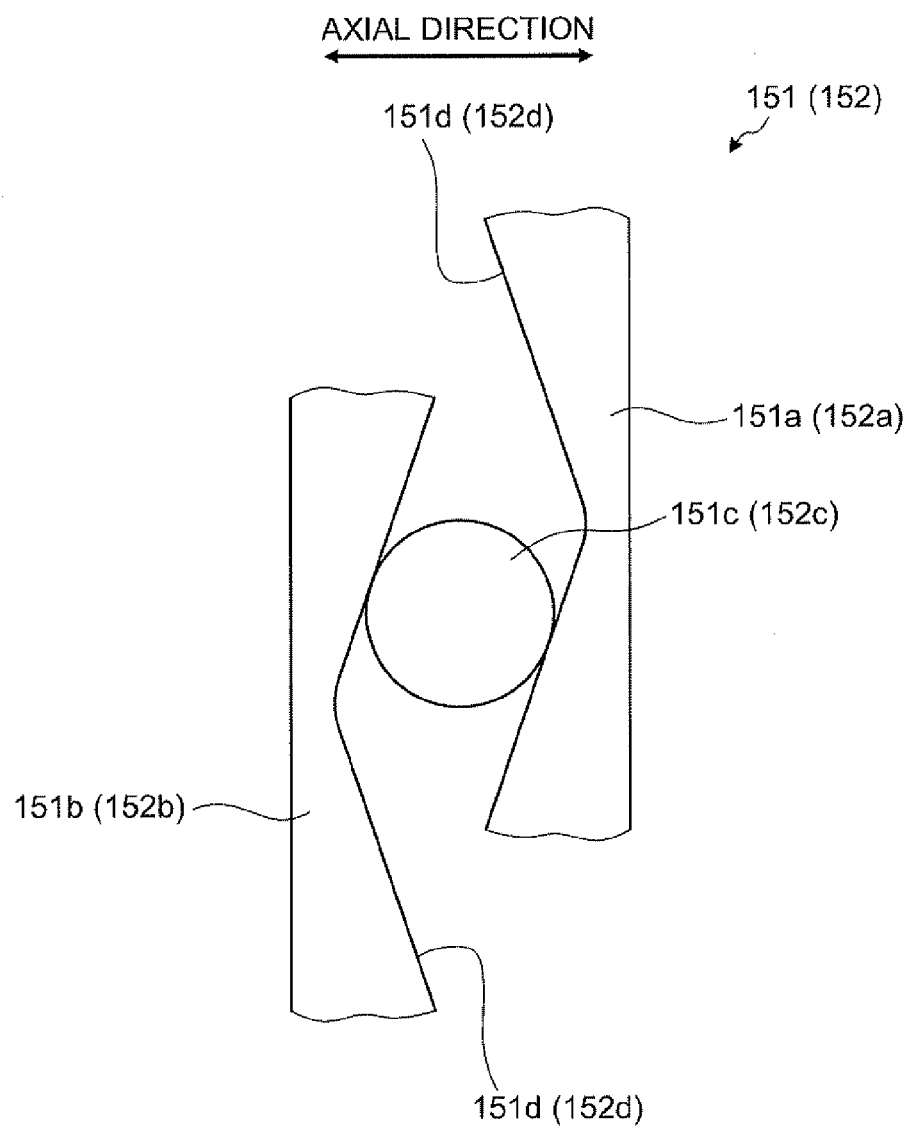

CONTINUOUSLY VARIABLE TRANSMISSION

FIELD

The present invention relates to a continuously variable transmission having a continuously variable transmission mechanism which includes an input member, an output member, and rotary members sandwiched therebetween, transmits torque between the input member and the output member by frictional forces generated by pressing the input member and the output member against the rotary members, and continuously varies a transmission gear ratio between the input member and the output member.

BACKGROUND

As this type of continuously variable transmission, what is called a toroidal continuously variable transmission having an input disc as the input member, an output disc as the output member, and friction rollers as the rotary members to vary a transmission gear ratio by changing a tilting angle of the friction rollers is known conventionally. For example, disclosed in the following Patent Literature 1 is a transmission having a pair of helical gears capable of generating, in an output disc, an axial pressing force toward an input disc. In this toroidal continuously variable transmission in the Patent Literature 1, when output torque of the engine is input to the input disc through an input shaft, the pair of helical gears generates the axial thrust (thrust force) from the output disc toward the input disc and presses the output disc with the thrust to thereby press the output disc against the input disc.

CITATION LIST

Patent Literature

Patent Literature 1: Japanese Patent Application Laid-open No. 6-17915

SUMMARY

Technical Problem

However, the pair of helical gears generates the axial thrust according to rotating directions of the respective driving and driven helical gears and therefore, when the rotating directions of the respective helical gears are reversed, a direction of the thrust becomes opposite. Therefore, in the toroidal continuously variable transmission in the Patent Literature 1, for example, when torque in a reverse direction is input to an output shaft as in deceleration, the rotating directions of the pair of helical gears connected to the output shaft are reversed as well and therefore a direction of the thrust generated by the pair of helical gears becomes opposite. As a result, in the continuously variable transmission, the pressing force directed toward the input disc does not act on the output disc, the force for sandwiching the friction rollers reduces, and therefore it may be impossible to secure a transmission torque capacity between the input disc and the output disc.

Therefore, it is an object of the present invention to provide a continuously variable transmission capable of mending the problem of the conventional technology and appropriately generating pressing forces in opposite directions along an axis between an input member and an output member.

Solution to Problem

To achieve the object as described above, a continuously variable transmission according to one aspect of the present invention includes a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes an axial force generating portion which rotates in one direction to generate a first axial force for pushing one of the input member and the output member toward the other and rotates in the other direction to generate a second axial force opposite to the first force and an opposite axial force transmitting portion for transmitting the second force to the other of the input member and the output member when the axial force generating portion generates the second force.

Further, the continuously variable transmission may further includes a first reaction force generating portion in charge of a reaction force of the first force for pushing the output member toward the input member, a second reaction force generating portion in charge of a reaction force of the second force for pushing the input member toward the output member, and a torque output portion capable of rotating with respect to a central shaft which is a center of rotation of respective rotary elements, giving and receiving torque and an axial force to and from the output member, and transmitting the torque of the output member to an outside, wherein the first reaction force generating portion may be disposed not to move in the axial direction with respect to the central shaft and formed of a torque input portion capable of giving and receiving torque and an axial force to and from the input member and transmitting torque from outside to the input member and the second reaction force generating portion may be formed of a wall face portion of the central shaft provided to an end portion of the torque output portion on an opposite side from the output member in the axial direction and a member disposed between the end portion of the torque output portion and the wall face portion of the central shaft to allow the torque output portion to rotate with respect to the central shaft and not to allow the torque output portion to axially move with respect to the central shaft.

Further, to achieve an object, a continuously variable transmission according to another aspect of the present invention includes a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes an axial force generating portion capable of generating a first axial force for pushing one of the input member and the output member toward the other and an opposite axial force transmitting portion for transmitting a second force to the other of the input member and the output member when the second axial force in an opposite direction to the first force is generated on a side of the one of the input member and the output member, the second axial force being a force for moving the one of the input member and the output member away from the other.

Further, the first axial force generating portion may generate the second force as well as the first force. Still further, the first axial force generating portion may rotate in one direction to generate the first force and rotate in the other direction to generate the second force

Advantageous Effects of Invention

Whichever direction the axial thrust generated by the axial force generating portion is in, the continuously variable transmission according to the invention can generate the axial force from the input member toward the output member or the axial force from the output member toward the input member by using the thrust. At this time, in one of these cases, it is possible to generate the axial force between the input member and the output member through the opposite axial force transmitting portion. Therefore, irrespective of the direction of the force generated by the axial force generating portion, the continuously variable transmission can sandwich the rotary members between the input member and the output member with desired contact pressure and obtain the suitable transmission torque capacity to thereby transmit the torque between the input and output sides. Moreover, the continuously variable transmission includes the first reaction force generating portion for bearing the first force of the axial force generating portion and a second reaction force generating portion for bearing the second force to thereby effectively generate the axial forces between the input member and the output member. By forming the first reaction force generating portion and the second reaction force generating portion by using existing members (e.g., the torque input portion such as the input shaft and the central shaft) of the continuously variable transmission, it is unnecessary to separately prepare new parts for the first reaction force generating portion and the second reaction force generating portion and the continuously variable transmission can be made compact. Therefore, a degree of freedom in installation of the continuously variable transmission is increased and a range of application of the continuously variable transmission to various power transmission mechanisms such as the in-wheel motor is broadened. When the second axial force opposite to the first force and in such a direction as to move one of the input member and the output member from the other is generated in the one of the input member and the output member, the continuously variable transmission according to the invention transmits the second force to the other by the opposite axial force transmitting portion to thereby generate the axial force between the input member and the output member. Therefore, irrespective of the direction of the force generated by the axial force generating portion, the continuously variable transmission can sandwich the rotary members between the input member and the output member with the desired contact pressure and obtain the suitable transmission torque capacity to thereby transmit the torque between the input and output sides.

BRIEF DESCRIPTION OF DRAWINGS

FIG. 2 is a drawing showing a shift shaft and a shift key included in the continuously variable transmission in the first embodiment.

FIG. 3 is a sectional view along a direction perpendicular to the axial direction and showing a structure of a main portion related to shift transmission of the continuously variable transmission in the first embodiment.

FIG. 8 is a partial schematic diagram for explaining another example of the input-side cam mechanism and the output-side cam mechanism.

DESCRIPTION OF EMBODIMENTS

Embodiments of a continuously variable transmission according to the present invention will be described in detail based on the drawings. The invention is not limited by the embodiments.

First Embodiment

The first embodiment of the continuously variable transmission according to the invention will be described based on FIGS. 1 to 7.

The continuously variable transmission in the first embodiment is formed as what is called a traction planetary gear mechanism made up of a plurality of rotary elements and includes an input member, an output member, and rotary members sandwiched therebetween. Torque is transmitted between the input member and the output member by frictional forces generated by pressing the input member and the output member against the rotary members and a transmission gear ratio between the input member and the output member is varied continuously. In this type of continuously variable transmission, the input member and the output member are pressed against the rotary members to thereby generate the frictional forces therebetween and the torque can be transmitted between the input member and the output member by the frictional forces. To explain the continuously variable transmission in line with various structures described later, the continuously variable transmission includes an input disc as the input member connected to an input shaft, an output disc as the output member connected to an output shaft, and planetary balls as the rotary members. In this continuously variable transmission, the input disc and the output disc are pressed against the planetary balls to generate the frictional forces therebetween to thereby transmit the torque between the input disc and the output disc. In this continuously variable transmission, by varying a ratio between a contact radius between the input disc and the planetary balls and a contact radius between the output disc and the planetary ball while maintaining a torque transmittable state, a ratio between a rotating speed (the number of rotations) of the input disc and a rotating speed (the number of rotations) of the output disc, i.e., a transmission gear ratio which is a ratio between the rotating speeds of the input shaft and the output shaft is varied continuously. The continuously variable transmission will be described below in detail by using FIG. 1.

Figure 1:
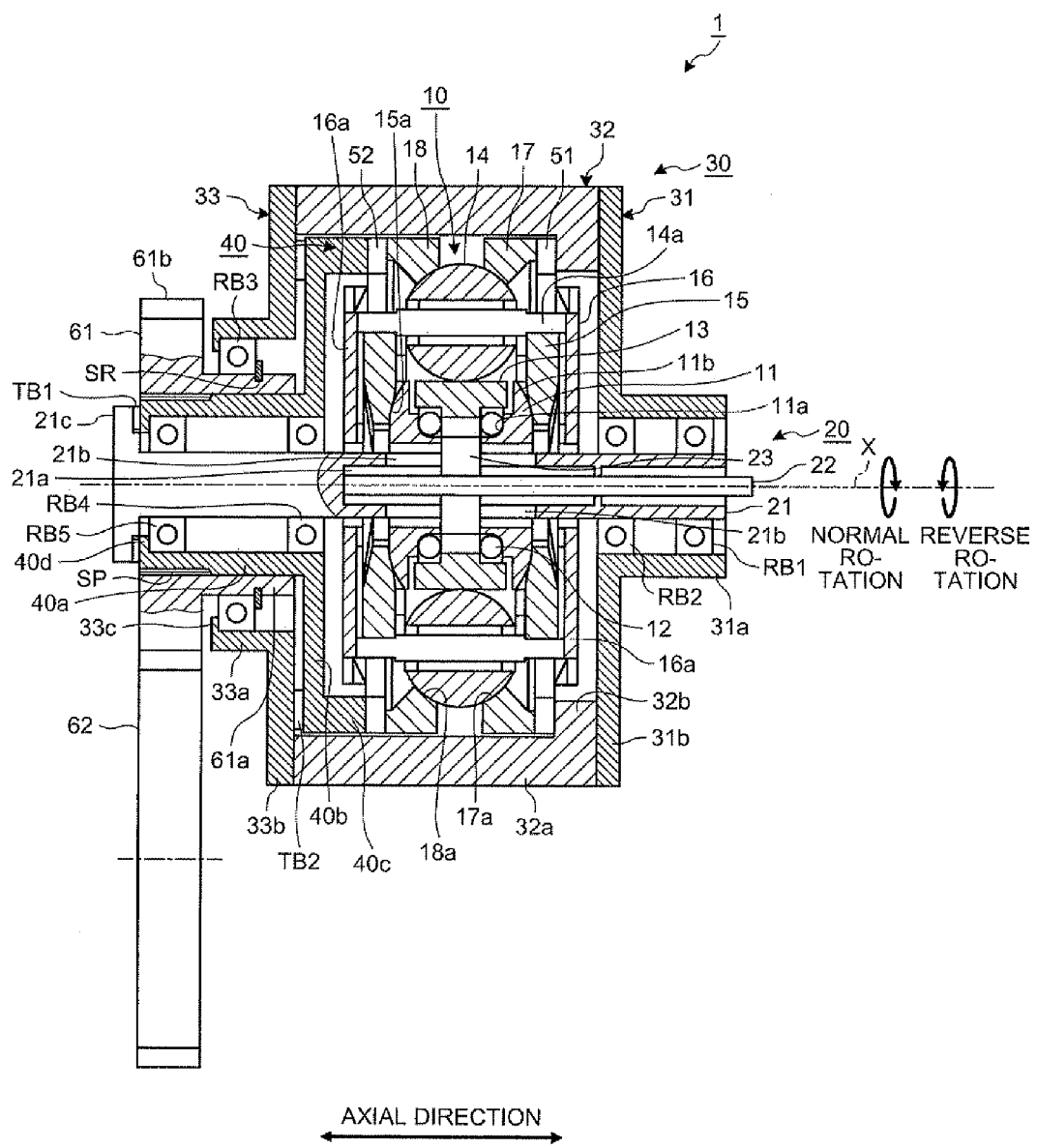
FIG. 1 is a sectional view along an axial direction and showing a structure of a first embodiment of a continuously variable transmission according to the present invention.

Reference numeral 1 in FIG. 1 designates the continuously variable transmission in the first embodiment. The continuously variable transmission 1 includes a continuously variable transmission mechanism 10 for continuously varying the transmission gear ratio, a shift mechanism 20 for actuating the continuously variable transmission mechanism 10, and two rotary torque transmission shafts respectively having functions as input and output shafts of the torque. In the first embodiment, one of the rotary torque transmission shafts will be described as an input shaft 30 and the other will be described as an output shaft 40 for the sake of convenience. However, the input side and the output side can be exchanged, i.e., the input shaft 30 can be configured as the output shaft and the output shaft 40 can be configured as the input shaft. Moreover, the input shaft 30 can also function as the output shaft and the output shaft 40 can also function as the input shaft.

In the continuously variable transmission 1, the input shaft 30 and the output shaft 40 are arranged coaxially. The input shaft 30 and the output shaft 40 share a rotation axis X as shown in FIG. 1. In the following description, a direction along the rotation axis X is referred to as an axial direction and a direction around the rotation axis X will be referred to as a circumferential direction unless otherwise specified. A direction orthogonal to the rotary axis X will be referred to as a radial direction and the radial direction includes a radially inward direction toward an inside and a radially outward direction toward an outside.

Firstly, the shift mechanism 20 will be described.

The shift mechanism 20 in the first embodiment includes a central shaft 21, a shift shaft 22, and a shift key 23. The shift mechanism 20 moves an idler plate 11 of the continuously variable transmission mechanism 10 (described later) in the axial direction by relatively moving the shift shaft 22 and the shift key 23 with respect to the central shaft 21 to thereby continuously vary the transmission gear ratio.

The central shaft 21 is an idler shaft having the rotation axis X as a central axis and is fixed to a fixed portion of the continuously variable transmission such as a vehicle body and a case (not shown), for example. In other words, the central shaft 21 is a fixed shaft which does not rotate with respect to the fixed portion. To put it concretely, the central shaft 21 is formed into a columnar shape about the rotation axis X as a central axis and includes a hollow portion 21a which is open at its one end in the axial direction and two slits 21b connecting the hollow portion 21a and a radially outer portion.

The hollow portion 21a is in a columnar shape about the rotation axis X as a central axis. The hollow portion 21a supports the inserted shift shaft 22 so that the shift shaft 22 can rotate with respect to the central shaft 21. For example, bearings (not shown) or the like may be used for the support. Each of the slits 21b is a through hole formed through the central shaft 21 from an outer peripheral face to the hollow portion 21a and is long in the axial direction. The two slits 21b are formed in symmetric positions with respect to the rotation axis X.

Furthermore, the central shaft 21 has a concentric disc portion 21c at an end portion without an opening of the hollow portion 21a. The disc portion 21c has a larger outer diameter than an outer peripheral face of a main portion of the central shaft 21. In other words, the end portion of the central shaft 21 has a flange-like shape because of the disc portion 21c. The outer diameter of the disc portion 21c is formed in such a size as to face an end portion (second annular portion 40d described later) of the output shaft 40 in the axial direction and forms a wall face portion of the central shaft 21.

The shift shaft 22 is formed into a columnar shape, for example, having such a length that its one end comes in contact with a wall of the hollow portion 21a in the axial direction and the other end protrudes from an opening of the hollow portion 21a when the shift shaft 22 is inserted into the hollow portion 21a to have the rotation axis X as its central axis. The shift shaft 22 has an external thread portion 22a shown in FIG. 2 helically formed in the circumferential direction in an outer peripheral face connecting respective portions which face the two slits 21b when the shift shaft 22 is inserted into the hollow portion 21a.

The shift key 23 has an internal thread portion 23a to be helically engaged with the external thread portion 22a of the shift shaft 22 as shown in FIG. 2. The internal thread portion 23a is helically formed in an inner peripheral face of a cylindrical portion. The shift key 23 also has key portions 23b which can move in a longitudinal direction along the slits 21b as shown in FIG. 2. The key portion 23b is in a shape of a plate protruding radially outward from an outer peripheral face of the cylindrical portion provided with the internal thread portion 23a and is provided to each of the slits 21b. To put it concretely, the key portions 23b are formed in such shapes as to pass through the slits 21b and protrude radially outward from the outer peripheral face of the central shaft 21. The key portions 23b are formed so that their axial widths are shorter than longitudinal lengths of the slits 21b as shown in FIG. 1. As a result, when the shift shaft 22 is rotated in the circumferential direction, the key portions 23b of the shift key 23 are locked to wall faces in the circumferential direction of the slits 21b and therefore the shift key 23 moves in the axial direction according to a direction of the rotation by action of screwing of the external thread portion 22a and the internal thread portion 23a with each other. In other words, the respective key portions 23b of the shift key 23 can axially reciprocate in the respective slits 21b by the rotation of the shift shaft 22. Here, the shift shaft 22 is rotated in the desired circumferential direction by a shift device (not shown). For example, the shift device includes an actuator such as an electric motor as a drive source and has also a link mechanism if necessary.

Firstly, the continuously variable transmission mechanism 10 in the first embodiment will be described in detail.

The continuously variable transmission mechanism 10 includes the idler plate 11, bearing balls 12, an idler roller 13, planetary balls 14, tilting arms 15, a carrier 16, an input disc 17, and an output disc 18.

The idler plate 11 is a bearing member for supporting the idler roller 13 for rotation. The idler plate 11 is formed into a cylindrical shape having the rotation axis X as its central axis and the central shaft 21 is inserted into the idler plate 11. To put it concretely, the idler plate 11 has an inner peripheral face with a larger diameter than the outer peripheral face of the central shaft 21 so as to be able to reciprocate in the axial direction with respect to the central shaft 21. The idler plate 11 has substantially the same axial length as the longitudinal lengths of the slits 21b, for example. A section of the idler plate 11 along the axial direction is tapered in the radially outward direction.

The idler plate 11 is mounted to the outer peripheral portion of the central shaft 21 with the respective key portions 23b of the shift key 23 interposed therebetween. Protruding ends of the respective key portions 23b are fitted with the inner peripheral portion of the idler plate 11. Therefore, as the shift key 23 moves in the axial direction, the idler plate 11 reciprocates in the axial direction with respect to the central shaft 21.

Furthermore, the idler plate 11 has a circumferential annular groove 11a formed radially inward from the outer peripheral face. The annular groove 11a is formed at an axial middle portion of the idler plate 11. In the annular groove 11a, annular boundaries between a bottom face and side wall faces are formed as smooth arc-shaped recessed curved faces. Here, the spherical bearing balls 12 are disposed on the annular boundary portions. In other words, the recessed curved faces of the boundary portions serve as bearing faces on which the bearing balls 12 are disposed.

The bearing balls 12 support the idler roller 13 for circumferential rotation.

The idler roller 13 serves as a rotation axis of the planetary balls 14. The idler roller 13 has a main body portion formed into a cylindrical shape having the rotation axis X as its central axis and is disposed in the annular groove 11a of the idler plate 11 so as to be rotatable with respect to the idler plate 11. To put it concretely, the idler roller 13 has substantially the same axial length as a groove width of the annular groove 11a while being able to smoothly rotate in the circumferential direction with respect to the idler plate 11. The idler roller 13 has a cylindrical portion having a smaller axial length than the main body portion and a smaller diameter of an inner wall face than the main body portion at an axial middle portion of an inner peripheral face of the main body portion and axial opposite end portions of the inner well of the cylindrical portion are brought into contact with the bearing balls 12. In other words, the idler roller 13 is supported on the idler plate 11 through the bearing balls 12 disposed at the boundary portions of the annular groove 11a so as to be rotatable in the circumferential direction with respect to the idler plate 11. Therefore, the idler roller 13 can serve as the rotation axis of the planetary balls 14 in contact with an outer peripheral face of the main body portion of the idler roller 13 and can reciprocate together with the idler plate 11 in the axial direction with respect to the central shaft 21 as the idler plate 11 moves in the axial direction.

The planetary balls 14 are rolling elements and correspond to ball-type pinions in a traction planetary gear mechanism. Although the planetary balls 14 are preferably perfect spherical bodies as shown in FIGS. 1 and 3, they may have oval sectional shapes as with a Rugby ball, for example, if their outer peripheral faces are smooth curved faces.

The planetary balls 14 are rotatably supported on support shafts 14a passing through centers of the planetary balls 14. For example, the planetary ball 14 is allowed to rotate (i.e., rotate on its axis) with respect to the support shaft 14a by bearings 14b disposed between an outer peripheral face of the support shaft 14a and the planetary ball 14.

The support shafts 14a are disposed so that their central axes are in the same plane as the rotation axis X. Standard positions of the support shafts 14a are positions where the central axes are parallel to the rotation axis X as shown in FIG. 1. Here, opposite end portions of the support shaft 14a protrude from an outer peripheral face (outer circumferential curved face) of the planetary ball 14 and mounted to tilting arms 15 described later. Therefore, the support shaft 14a swings (tilts) from the standard position in FIG. 1 to a tilted position or from the tilted position to the standard position as the tilting arms 15 move. The tilting is carried out in the same plane as the central axis of the support shaft 14a and the rotation shaft X.

Here, the plurality of (e.g., eight as shown in FIG. 3) planetary balls 14 are provided on an outer peripheral side of the idler roller 13. Therefore, the support shafts 14a and the bearings 14b are provided to correspond to the number of planetary balls 14. The respective planetary balls 14 are disposed at predetermined intervals and substantially out of touch with each other so that drag torque does not act between the respective planetary balls 14 when the planetary balls 14 roll on the outer peripheral face of the idler roller 13.

The tilting arms 15 are members for applying tilting forces to the support shafts 14a and the planetary balls 14 as the idler plate 11 moves in the axial direction to tilt the rotation central axes of the planetary balls 14, i.e., the central axes of the support shafts 14a. The tilting arms 15 are formed into shapes extending in a direction perpendicular to the rotation axis X.

To put it concretely, the tilting arms 15 are formed to have tapered radially inward tip end portions. The tilting arms 15 are respectively disposed at opposite end portions of the support shafts 14a and the end portions of the respective support shafts 14a are mounted to radially outer end portions of the tilting arms 15. The tilting arms 15 are disposed so as not to move in the axial direction and not to rotate in the circumferential direction with respect to the central shaft 21.

The pair of tilting arms 15 mounted to the opposite end portions of the support shaft 14a is provided to each set of the support shaft 14a and the planetary ball 14. The pair of tilting arms 15 sandwiches wall faces of axial opposite end portions of the idler plate 11 between tapered wall faces of radially inner tip end portions of the respective tilting arms 15. The pair of tilting arms 15 has the respective tapered wall faces as contact faces 15a with the idler plate 11. The pair of tilting arms 15 is formed to have such tip end portions that the contact faces 15a facing each other in the axial direction extend away from each other toward the radially inside.

On the other hand, the idler plate 11 has respective wall faces of the axial opposite end portions as contact faces 11b with the contact faces 15a of the respective tilting arms 15. The idler plate 11 has the sectional shape along the axial direction and tapered radially outward as described above. Therefore, sectional shapes of the contact faces 11b at the opposite end portions of the idler plate 11 along the axial direction are also tapered radially outward. Here, the respective contact faces 11b are curved faces protruding axially outward.

By forming the contact faces 11b of the idler plate 11 and the contact faces 15a of the tilting arms 15 as described above, the contact faces 11b of the idler plate 11 and the contact faces 15a of the respective tilting arms 15 come in point contact or line contact with each other. Therefore, at respective contact portions between them, a load of the idler plate 11 moving along the axial direction acts as diagonally outward forces with respect to the central shaft 21 on the respective tilting arms 15. The tilting arms 15 tilt the support shaft 14a in the above-described plane with the forces. As a result, each support shaft 14a and the planetary ball 14 tilt in the above-described plane by the forces acting on the tilting arms 15 when the idler plate 11 is moved in the axial direction.

The carrier 16 forms what is called a stator drum when it is applied to an in-wheel motor 200 described later and retains the planetary balls 14, the support shafts 14a, and the tilting arms 15 so that they do not move in the axial direction with respect to the central shaft 21. The carrier 16 has a pair of disc portions 16a having the rotation axis X as its central axis. The respective disc portions 16a are disposed in such positions as to sandwich the planetary balls 14, the support shafts 14a, the tilting arms 15, and the like in the axial direction in such a manner that the disc portions 16a do not move in the axial direction and do not rotate in the circumferential direction with respect to the central shaft 21.

In this carrier 16, the respective disc portions 16a are connected by a plurality of connecting shafts (not shown) and formed into a shape of a cage as a whole. As a result, the carrier 16 has open portions on its outer peripheral face. A portion of each planetary ball 14 protrudes radially outward from the outer peripheral face of the carrier 16 through the open portion.

In this carrier 16, the same number of radial grooves as the above-described pairs of tilting arms 15 are formed on each of opposed faces of the respective disc portions 16a. The respective radial grooves form a radial shape radiating from the rotation axis X and are formed at predetermined intervals along the circumferential direction. Each radial groove is formed in a position, a shape, and a size corresponding to each tilting arm 15. For example, each radial groove is formed from a central portion to an outer peripheral edge. Here, the respective tilting arms 15 are disposed in the respective radial grooves so as to carry out the above-described tilting operation and not to move in the axial direction and not to rotate in the circumferential direction with respect to the central shaft 21.

The input disc 17 and the output disc 18 come in contact with the outer peripheral faces of the respective planetary balls 14 exposed radially outward from the open portions of the carrier 16 to transmit mechanical power, i.e., the torque between the respective planetary balls 14 and themselves. The input disc 17 is an input-side rotating body to which torque is input from the input shaft 30 described later and forms the input member of the continuously variable transmission mechanism 10. On the other hand, the output disc 18 is an output-side rotating body for outputting the torque transmitted from the input disc 17 through the respective planetary balls 14 to the output shaft 40 described later and forms the output member of the continuously variable transmission mechanism 10.

The input disc 17 and the output disc 18 are respectively formed into annular shapes having the rotation axis X as their central axes. The input disc 17 and the output disc 18 are disposed to face each other in the axial direction and to sandwich the respective planetary balls 14. The input disc 17 and the output disc 18 have contact faces 17a and 18a in contact with the outer peripheral faces of the respective planetary balls 14. The contact face 17a is provided to a radially outer end portion of the input disc 17. On the other hand, the contact face 18a is provided to a radially outer end portion of the output disc 18. The respective contact faces 17a and 18a have recessed arc faces having a curvature equal to a curvature of the curved outer peripheral faces of the planetary balls 14.

The input disc 17 is formed to have an outer diameter slightly smaller than an inner diameter of a cylindrical portion 32a of an input hub 32 of the input shaft 30 described later. The input disc 17 is disposed between the respective planetary balls 14 and an annular portion 32b of the input hub 32. As a result, the radially outer end portion of the input disc 17 faces an annular face of the annular portion 32b of the input hub 32 in the axial direction.

On the other hand, the output disc 18 is formed to have an outer diameter slightly smaller than the inner diameter of the cylindrical portion 32a of the input hub 32. The output disc 18 is disposed between the respective planetary balls 14 and a second cylindrical portion 40c of the output shaft 40 described later in the axial direction. As a result, the radially outer end portion of the output disc 18 faces an annular end face of the second cylindrical portion 40c in the axial direction.

The continuously variable transmission 1 in the first embodiment is provided with an input-side cam mechanism 51 and an output-side cam mechanism 52.

The input-side cam mechanism 51 is for converting torque acting between the input hub 32 and the input disc 17 into a thrust in the axial direction and a torque cam mechanism is used as the input-side cam mechanism 51, for example. The input-side cam mechanism 51 is disposed between the annular face of the annular portion 32b of the input hub 32 and the radially outer end portion of the input disc 17. The input-side cam mechanism 51 forms, together with the input shaft 30, a torque input portion for transmitting torque from outside to the input disc 17.

The output-side cam mechanism 52 is for converting torque acting between the output disc 18 and the output shaft 40 into a thrust in the axial direction and a torque cam mechanism can be used similarly as the output-side cam mechanism 52. The output-side cam mechanism 52 is disposed between the radially outer end portion of the output disc 18 and the annular end face of the second cylindrical portion 40c of the output shaft 40. The output-side cam mechanism 52 forms, together with the output shaft 40, a torque output portion for transmitting torque of the output disc 18 after shift transmission to the outside.

Figure 4:
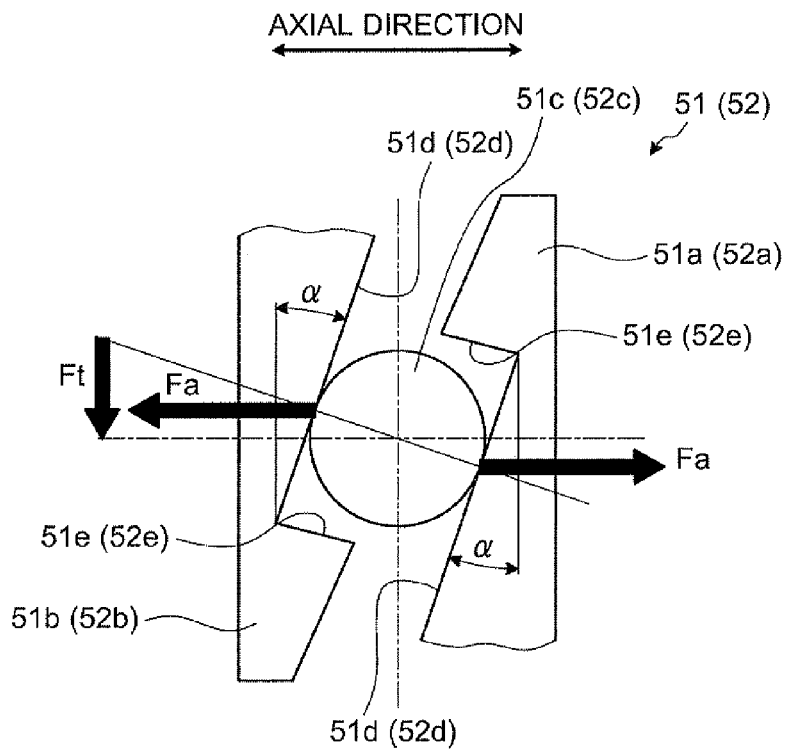
FIG. 4 is a partial schematic diagram for explaining an example of an input-side cam mechanism and an output-side cam mechanism included in the continuously variable transmission in the first embodiment.

FIG. 4 shows an example of a structure related to a principle of the input-side cam mechanism 51 and the output-side cam mechanism 52. The input-side cam mechanism 51 shown here as an example generates the axial thrust when the input shaft 30 is rotated by torque in a normal direction to rotate the input disc 17 in the same direction or when the input disc 17 is rotated by torque in a reverse direction to rotate the input shaft 30 in the same direction. Here, for the sake of convenience, rotation of the input shaft 30 and the like in one circumferential direction is referred to as "normal rotation" while rotation in a reverse direction to this normal rotation is referred to as "reverse rotation".

The input-side cam mechanism 51 includes an annular first rotary member 51a and an annular second rotary member 51b having the rotation axis X as their rotation axes and disposed to face each other on the rotation axis X and cam rollers 51c sandwiched between respective opposed faces of the first rotary member 51a and the second rotary member 51b. Here, the cam roller 51c is sandwiched between cam faces 51d respectively formed on the opposed faces of the first rotary member 51a and the second rotary member 51b. One of the respective cam faces 51d is inclined so that an axial interval between a standard face and itself gradually widens in the circumferential direction in the normal rotation and the other is inclined so that an axial interval between the standard face and itself gradually narrows in the circumferential direction in the normal rotation. The standard face is an imaginary plane including the normal to the rotation axis X. There are the plurality of cam rollers 51c and the cam faces 51d are formed to correspond to the number of cam rollers 51c.

Here, the first rotary member 51a is disposed to rotate integrally with the annular face of the annular portion 32b of the input hub 32 and the second rotary member 51b is disposed to rotate integrally with the radially outer end portion of the input disc 17. Therefore, in the input-side cam mechanism 51, if the torque in the normal direction is input to the input shaft 30 or the torque in the reverse direction is input to the input disc 17, an interval between the respective cam faces 51d narrows and the respective cam faces 51d push the cam roller 51c against each other to be integrated with each other. In this way, in the input-side cam mechanism 51, when the torque in the normal direction is input to the input shaft 30, the torque is transmitted from the input hub 32 to the input disc 17. When the torque in the reverse direction is input to the input disc 17, the torque is transmitted from the input disc 17 to the input hub 32 (input shaft 30).

Furthermore, when the torque in the normal direction is input to the input shaft 30 or when the torque in the reverse direction is input to the input disc 17, the input-side cam mechanism 51 generates the axial thrust according to the torque and an inclination angle of the cam faces 51d. This will be roughly described. When the input torque is Tin, the number of cam rollers 51c is n, and a radius at the first rotary member 51a and the second rotary member 51b in a position where the cam roller 51c is provided is r, a load Ft in the circumferential direction (in a direction of a tangent) in a position where the cam roller 51c is pinched can be expressed by the following expression 1.

$$Ft = Tin/(n \cdot r) \quad (1)$$

When the inclination angle of the cam faces 51d is α, the thrust Fa acting in the axial direction can be expressed by the following expression 2.

$$Fa = Ft/\tan(\alpha/2) \quad (2)$$

The thrust generated by the input-side cam mechanism 51 acts toward the input disc 17 and the input hub 32. For example, by respectively fixing the central shaft 21 and the input shaft 30 to a fixed portion such as the vehicle body which cannot move relatively, the input shaft 30 becomes unable to move in the axial direction with respect to the central shaft 21. Therefore, the thrust of the input-side cam mechanism 51 acting toward the input hub 32 can be born by a reaction force of the annular portion 32b (described later) of the input hub 32. In other words, the annular portion 32b performs a function as a reaction force generating portion (first reaction force generating portion) for generating the reaction force for bearing the thrust. The thrust of the input-side cam mechanism 51 acting toward the input disc 17 (i.e., the axial pressing force for pressing the input disc 17 toward the output disc 18) is successively transmitted to the output disc 18, the output-side cam mechanism 52, and the output shaft 40 via the respective planetary balls 14. Here, axial one end of the output shaft 40 is in contact with a thrust bearing TB1 (described later) and cannot move axially toward the thrust bearing TB1 with respect to the central shaft 21. Therefore, the thrust (pressing force) can be born by a reaction force of the thrust bearing TB1 and the disc portion 21c. In other words, the thrust bearing TB1 and the disc portion 21c perform a function as a reaction force generating portion (second reaction force generating portion) for generating the reaction force for bearing the thrust (pressing force). Therefore, the thrust generated by the input-side cam mechanism 51 can push the input disc 17 against the respective planetary balls 14 and can push the output disc 18 against the respective planetary balls 14. Because the first reaction force generating portion and the second reaction force generating portion are formed by using existing parts of the conventional continuously variable transmission, it is unnecessary to separately prepare new parts for the first reaction force generating portion and the second reaction force generating portion, which makes the continuously variable transmission 1 compact. As a result, a degree of freedom in installation of the continuously variable transmission 1 increases and a range of application of the continuously variable transmission 1 to the in-wheel motor and the like broadens.

The output-side cam mechanism 52 has a similar structure to the input-side cam mechanism 51. In other words, the output-side cam mechanism 52 includes a first rotary member 52a, a second rotary member 52b, cam rollers 52c, and cam faces 52d. Here, the first rotary member 52a is disposed to rotate integrally with the radially outer end portion of the output disc 18 and the second rotary member 52b is disposed to rotate integrally with the annular end face of the second cylindrical portion 40c. In this way, in the output-side cam mechanism 52, when torque in the normal direction is input to the output disc 18 or when torque in the reverse direction is input to the output shaft 40, an interval between the respective cam faces 52d narrows and the respective cam faces 52d push the cam rollers 52c against each other to be integrated with each other. Therefore, in the output-side cam mechanism 52, when the torque in the normal direction is input to the output disc 18, the torque is transmitted from the output disc 18 to the output shaft 40. When the torque in the reverse direction is input to the output shaft 40, the torque is transmitted from the output shaft 40 to the output disc 18. When the torque in the normal direction is input to the output disc 18 or when the torque in the reverse direction is input to the output shaft 40, the output-side cam mechanism 52 generates an axial thrust according to the torque and an inclination angle of the cam faces 52d.

The thrust generated by the output-side cam mechanism 52 acts toward the output disc 18 and the output shaft 40. The thrust of the output-side cam mechanism 52 acting toward the output disc 18 (i.e., an axial pressing force for pressing the output disc 18 toward the input disc 17) is successively transmitted to the input disc 17, the input-side cam mechanism 51, and the input shaft 30 via the respective planetary balls 14. The thrust (pressing force) can be born by the reaction force of the first reaction force generating portion (the annular portion 32b of the input hub 32). On the other hand, the thrust of the output-side cam mechanism 52 acting toward the output shaft 40 can be born by the reaction force of the second reaction force generating portion (the thrust bearing TB1 and the disc portion 21c of the central shaft 21). Therefore, the thrust generated by the output-side cam mechanism 52 can push the output disc 18 against the respective planetary balls 14 and can push the input disc 17 against the respective planetary balls 14.

As described above, in the continuously variable transmission mechanism 10, the input disc 17 and the output disc 18 are pushed against the respective planetary balls 14 according to the torque on each of the input and output sides.

In the input-side cam mechanism 51, at portions of the respective cam faces 51d where the axial interval between the cam faces 51d is the widest, lock faces 51e are formed each for locking the cam roller 51c which has rolled on the cam face 51d when the torque in the reverse direction is input to the input shaft 30 or when the torque in the normal direction is input to the input disc 17. As a result, the input-side cam mechanism 51 cannot generate the axial thrust at this time but can integrate the first rotary member 51a and the second rotary member 51b to rotate them in the same direction according to the torque. The lock faces 51e prevent the cam rollers 51c from falling off. Similar lock faces 52e are provided to the output-side cam mechanism 52 as well. Therefore, when the torque in the reverse direction is input to the output disc 18 or when the torque in the normal direction is input to the output shaft 40, the output-side cam mechanism 52 cannot generate the axial thrust but can integrate the first rotary member 52a and the second rotary member 52b to rotate them in the same direction according to the torque.

The input shaft 30 in the first embodiment includes a torque input member 31 to which the torque is input from outside and the input hub 32 as an input torque transmitting member for transmitting the input torque transmitted from the torque input member 31 to the continuously variable transmission mechanism 10 and transmits the input torque to the input disc 17 of the continuously variable transmission mechanism 10 via the input-side cam mechanism 51.

The torque input member 31 is made up of a cylindrical portion 31a having the rotation axis X as its central axis and a flange-like annular portion 31b having one end of the cylindrical portion 31a on its inner peripheral side and extending radially outward. The torque input member 31 is supported at an inner peripheral face of the cylindrical portion 31a and though radial bearings RB1 and RB2 on the central shaft 21 so as to be rotatable with respect to the central shaft 21.

On the other hand, the input hub 32 is made up of the cylindrical portion 32a having the rotation axis X as the central axis and the flange-like annular portion 32b having one end of the cylindrical portion 32a on the torque input member 31 side on its outer peripheral side and extending radially inward. The cylindrical portion 32a is formed to have an outer diameter substantially equal to the outer diameter of the annular portion 31b of the torque input member 31. The input hub 32 is connected to the torque input member 31 through the respective annular wall faces of the annular portion 32b and the annular portion 31b so as to rotate integrally with the torque input member 31. The annular portion 32b has the function as the first reaction force generating portion as described above and bears the thrust of the input-side cam mechanism 51, for example, by the reaction force.

Here, the input shaft 30 in this state is supported at its one end on the torque input member 31 side. Therefore, in order to achieve distribution of the load and smooth rotation by both-end support, the input shaft 30 is provided with a support member 33 for supporting an open end of the input hub 32.

The support member 33 is made up of a cylindrical portion 33a having the rotation axis X as its central axis, a flange-like first annular portion 33b having one end on the input hub 32 side of the cylindrical portion 33a on its inner peripheral side and extending radially outward, and a flange-like second annular portion 33c having the other end of the cylindrical portion 33a on its inner peripheral side and extending radially inward. The first annular portion 33b is formed to have an outer diameter substantially equal to the outer diameter of the cylindrical portion 32a of the input hub 32. The support member 33 is connected to the open end of the cylindrical portion 32a of the input hub 32 through its first annular portion 33b so as to rotate integrally with the input hub 32. The support member 33 is supported at an inner peripheral face of the cylindrical portion 33a and through a radial bearing RB3 on an outer peripheral face of a cylindrical portion 61a of a first helical gear 61 (described later) so as to be rotatable with respect to the cylindrical portion 61a. In other words, the input shaft 30 is supported through the radial bearings RB1, RB2, and RB3.

Furthermore, the second annular portion 33c is provided so that its annular wall face on the continuously variable transmission mechanism 10 side is in contact with an annular wall face of the radial bearing RB3. In this contact state, a snap ring SR (described later) is in contact with an axially opposite annular wall face of the radial bearing RB3.

The output shaft 40 in the first embodiment is an output hub for outputting output torque, transmitted from the output disc 18 of the continuously variable transmission mechanism 10 via the output-side cam mechanism 52, to the outside. The output shaft 40 is disposed to face the torque input member 31 of the input shaft 30 in the axial direction with the continuously variable transmission mechanism 10 interposed therebetween.

The output shaft 40 is made up of a first cylindrical portion 40a having the rotation axis X as its central axis, a flange-like first annular portion 40b having one end on the continuously variable transmission mechanism 10 side of the first cylindrical portion 40a on its inner peripheral side and extending radially outward, a second cylindrical portion 40c extending from an outer peripheral end portion of the first annular portion 40b toward the continuously variable transmission mechanism 10, and the flange-like second annular portion 40d having the other end of the first cylindrical portion 40a on its outer peripheral side and extending radially inward.

The first cylindrical portion 40a is disposed radially inside the support member 33 of the input shaft 30 and an inner peripheral face of the first helical gear 61 is fitted over an outer peripheral face of the first cylindrical portion 40a through splines SP (described later). The output shaft 40 is supported at an inner peripheral face of the first cylindrical portion 40a on the central shaft 21 through radial bearings RB4 and RB5 so as to be rotatable with respect to the central shaft 21.

The first annular portion 40b is disposed on the continuously variable transmission mechanism 10 side of the support member 33 of the input shaft 30 and the second cylindrical portion 40c is disposed radially inside the input hub 32 of the input shaft 30. Here, the first annular portion 40b and the second cylindrical portion 40c are formed to have outer diameters substantially equal to the outer diameter of the output disc 18. In other words, the first annular portion 40b and the second cylindrical portion 40c are formed to have outer diameters slightly smaller than the inner diameter of the cylindrical portion 32a of the input hub 32.

Furthermore, an annular wall face of the second annular portion 40d on the continuously variable transmission mechanism 10 side (right side of a plane of paper of FIG. 1) faces an annular wall face of the radial bearing RB5 in the axial direction and an annular wall face of the second annular portion 40d on an opposite side (left side of the plane of the paper of FIG. 1) faces an annular wall face formed of the disc portion 21c of the central shaft 21 in the axial direction. In other words, the second annular portion 40d is in a position sandwiched between the radial bearing RB5 and the disc portion 21c of the central shaft 21 in the axial direction. Here, in the second annular portion 40d, the annular wall face on the continuously variable transmission mechanism 10 side is in contact with the annular wall face of the radial bearing RB5. On the other hand, a thrust bearing TB1 is disposed between the annular wall face on the opposite side and the annular wall face formed of the disc portion 21c. The thrust bearing TB1 is a member which allows the output shaft 40 to rotate with respect to the central shaft 21 but does not allow the output shaft 40 to axially move toward the first disc portion 21c with respect to the central shaft 21. Therefore, the output shaft 40 is prevented, by its second annular portion 40d, the thrust bearing TB1, and the disc portion 21c, from moving with respect to the central shaft 21 in an axial opposite direction (toward the left side of the plane of the paper of FIG. 1) to a direction of pushing the output disc 18 against the respective planetary balls 14. Therefore, if a force in the axial direction (toward the left side of the plane of the paper of FIG. 1) of the output shaft 40 acts on the output shaft 40 due to the thrust of the output-side cam mechanism 52, for example, the force is born by the reaction force of the second reaction force generating portion (the thrust bearing TB1 and the disc portion 21c of the central shaft 21) as described above.

Here, between the respective annular wall faces of the first annular portion 40b of the output shaft 40 and the first annular portion 33b of the support member 33 of the input shaft 30, a thrust bearing TB2 for allowing rotation of the output shaft 40 and the input shaft 30 with respect to each other is disposed.

To the output shaft 40, a pair of helical gears (the first helical gear 61 and a second helical gear 62) engaged with each other is mounted. Here, the first helical gear 61 is caused to rotate integrally with and coaxially with the output shaft 40. The pair of helical gears generates the thrust (thrust force) in such a direction (toward the right side of the plane of the paper of FIG. 1 in the axial direction) as to push the output disc 18 against the respective planetary balls 14 from the first helical gear 61 when the output shaft 40 is rotating in the normal direction. On the other hand, when the output shaft 40 is rotating in the reverse direction, the pair of helical gears generates the thrust (thrust force) in the opposite direction (toward the left side of the plane of the paper in FIG. 1) from the first helical gear 61. In other words, the pair of helical gears forms a generating portion of the axial force (axial force generating portion) for generating the thrust (first force) in such an axial direction as to push the output disc 18 toward the input disc 17 by rotating in one direction (rotating in the normal direction) while generating the opposite force (second force) in the axial direction opposite to the thrust by rotating in the other direction (rotating in the reverse direction).

The first helical gear 61 has the cylindrical portion 61*a* having the rotation axis X as its central axis and a gear portion 61*b* is formed at one end in the axial direction of the cylindrical portion 61*a*. In the first helical gear 61, the cylindrical portion 61*a* is positioned on the continuously variable transmission mechanism 10 side (right side of the plane of the paper of FIG. 1) of the gear portion 61*b*.

Here, the cylindrical portion 61*a* and the gear portion 61*b* have inner peripheral faces facing the outer peripheral face of the first cylindrical portion 40*a* of the output shaft 40 in the radial direction and have inner diameters substantially equal to an outer diameter of the first cylindrical portion 40*a* of the output shaft 40. In the first embodiment, the splines SP to be engaged with each other are formed on the inner peripheral faces of the cylindrical portion 61*a* and the gear portion 61*b* (i.e., the inner peripheral face of the first helical gear 61) and the outer peripheral faces of the first cylindrical portion 40*a*, and first helical gear 61 and the first cylindrical portion 40*a* are fitted with each other through the splines SP. The splines SP cause the first helical gear 61 to rotate integrally with the output shaft 40. Moreover, the splines SP transmit the thrust in the normal rotation of the first helical gear 61 to the output shaft 40 when the first helical gear 61 is rotating in the normal direction with the output shaft 40.

An outer peripheral face of the cylindrical portion 61*a* of the first helical gear 61 faces the inner peripheral face of the cylindrical portion 33*a* of the support member 33 of the input shaft 30 in the radial direction. As described above, between the outer peripheral face of the cylindrical portion 61*a* and the inner peripheral face of the cylindrical portion 33*a*, the radial bearing RB3 is disposed. In other words, the radial bearing RB3 is disposed in such a position that one annular wall face (on the right side of the plane of the paper of FIG. 1) of the radial bearing RB3 faces the first annular portion 40*b* of the output shaft 40 and the other annular wall face (on the left side of the plane of the paper of FIG. 1) faces the gear portion 61*b*. Here, an annular wall face of the second annular portion 33*c* of the support member 33 of the input shaft 30 is in contact with the other annular wall face of the radial bearing RB3 in a stationary state of the first helical gear 61. The cylindrical portion 61*a* is provided with an annular member for coming in contact with the one annular wall face of the radial bearing RB3 in this state. The annular member has a larger outer diameter than the outer peripheral face of the cylindrical portion 61*a* and is disposed not to be movable at least in the axial direction with respect to the cylindrical portion 61*a*. The annular member may be a member formed integrally with the cylindrical portion 61*a* or a separate member mounted to the cylindrical portion 61*a*. As the annular member, the snap ring SR disposed in an annular groove formed in the outer peripheral face of the cylindrical portion 61*a* is used here, for example. In this manner, the radial bearing RB3 is sandwiched in the axial direction between the second annular portion 33*c* of the support member 33 of the input shaft 30 and the snap ring SR provided to the first helical gear 61.

The first helical gear 61 generates the thrust for pushing the output disc 18 against the respective planetary balls 14 (toward the right side of the plane of the paper of FIG. 1 in the axial direction) when the output shaft 40 is rotating in the normal direction. Therefore, the first helical gear 61 in this case transmits the thrust to the output shaft 40 through the splines SP and presses the output shaft 40 in the same direction as the thrust. The force in the axial direction of the output shaft 40 and caused by the pressing acts as the pressing force for pressing the output disc 18 toward the input disc 17 and is transmitted to the output disc 18, the respective planetary balls 14, the input disc 17, the input-side cam mechanism 51, and the input shaft 30 through the output-side cam mechanism 52. Therefore, the pressing force is born by the reaction force of the first reaction force generating portion (the annular portion 32*b* of the input hub 32). As a result, in the normal rotation of the output shaft 40, by means of the thrust of the first helical gear 61, the output disc 18 can be pushed against the respective planetary balls 14 and the input disc 17 can be pushed against the respective planetary balls 14.

On the other hand, when the output shaft 40 is rotating reversely, the first helical gear 61 generates the thrust in the opposite axial direction (toward the left side of the plane of the paper of FIG. 1). Because the first helical gear 61 is not locked to the output shaft 40 in the axial direction by workings of the splines SP, the axial force caused by the thrust of the first helical gear 61 does not act on the output shaft 40. In this case, the output shaft 40 cannot push the output disc 18 against the respective planetary balls 14 by the thrust of the pair of helical gears (the first helical gear 61 and the second helical gear 62). Even if the thrust of the first helical gear 61 can be transmitted to the output shaft 40, movement of the output shaft 40 in the direction of the thrust with respect to the central shaft 21 is restricted by the thrust bearing TB1 and the disc portion 21*c* in the continuously variable transmission 1 and therefore the output shaft 40 does not exert the axial force on the output disc 18.

However, the thrust of the first helical gear 61 is similarly acting on the snap ring SR and therefore, the thrust is transmitted to the radial bearing RB3 through the snap ring SR and to the input shaft 30 through the second annular portion 33*c* in contact with the radial bearing RB3. Therefore, the thrust in the axial direction (toward the left side of the plane of the paper of FIG. 1) and transmitted to the input shaft 30 acts as the pressing force for pressing the input disc 17 toward the output disc 18 and is transmitted from the annular portion 32*b* of the input hub 32 to the input disc 17, the respective planetary balls 14, the output disc 18, the output-side cam mechanism 52, the output shaft 40, the thrust bearing TB1, and the disc portion 21*c* of the central shaft 21 via the input-side cam mechanism 51. Therefore, the pressing force is born by the reaction force of the second reaction force generating portion (the thrust bearing TB1 and the disc portion 21*c*). As a result, in the reverse rotation of the output shaft 40, the thrust force of the first helical gear 61 in the reverse direction can push the output disc 18 against the respective planetary balls 14 and push the input disc 17 against the respective planetary balls 14.

In this manner, in the continuously variable transmission 1, it is possible to generate the force for pushing the output disc 18 against the respective planetary balls 14 and the force for pushing the input disc 17 against the respective planetary balls 14 by means of the thrust of the pair of helical gears (the first helical gear 61 and the second helical gear 62) even in the reverse rotation of the output shaft 40. In other words, in the continuously variable transmission 1, in the reverse rotation of the output shaft 40 (i.e., when the axial thrust of the pair of helical gears is in the opposite direction), the input shaft 30, the radial bearing RB3, and the snap ring SR function as the opposite axial force transmitting portion for transmitting the thrust to the input disc 17. In the continuously variable transmission 1, the opposite axial force transmitting portion can generate the pressing forces for pressing the input disc 17 and the output disc 18 against the respective planetary balls 14 in the reverse rotation of the output shaft 40.

In the continuously variable transmission 1 in the first embodiment formed as described above, if the torque is input to the input shaft 30, the input shaft 30 rotates with respect to the central shaft 21 according to the rotating direction of the torque. Because the input disc 17 is connected to the input shaft 30 with the input-side cam mechanism 51 interposed therebetween, the input disc 17 rotates together with the input shaft 30 and the input-side cam mechanism 51 in the same direction as the input shaft 30 with respect to the central shaft 21.

For example, when the input shaft 30 is rotating in the normal direction as when the torque in the normal direction is input to the input shaft 30, the thrust toward the input disc 17 and the thrust toward the annular portion 32b of the input hub 32 are generated in the input-side cam mechanism 51. As described above, in this case, by means of the thrust of the input-side cam mechanism 51, the reaction force of the first reaction force generating portion (the annular portion 32b of the input hub 32), and the reaction force of the second reaction force generating portion (the thrust bearing TB1 and the disc portion 21c of the central shaft 21), the input disc 17 and the output disc 18 can be pushed against the respective planetary balls 14. As a result, in the normal rotation of the input shaft 30, the frictional forces are generated between the contact face 17a of the input disc 17 and the outer peripheral faces of the respective planetary balls 14. Therefore, by means of the frictional forces, the torque is transmitted to the respective planetary balls 14 from the input disc 17. Here, the thrust of the input-side cam mechanism 51 is of magnitude according to the torque of the input shaft 30.

At this time, the respective planetary balls 14 are rotatably supported by the support shafts 14a passing through the centers of the planetary balls 14 and the idler roller 13 and therefore rotate on their axes due to the torque transmitted from the input disc 17. The idler roller 13 rotates about the rotation axis X as the planetary balls 14 rotate about their axes. The respective planetary balls 14 rotating about their axes are in contact at their outer peripheral faces with the contact face 18a of the output disc 18. Therefore, frictional forces are also generated at the contact portions and therefore, by the frictional forces, the torque is transmitted to the output disc 18 from the respective planetary balls 14. The output disc 18 is caused to rotate in the same direction as the input shaft 30 and the input disc 17 with respect to the central shaft 21 by the torque from the respective planetary balls 14.

The output shaft 40 is connected to the output disc 18 with the output-side cam mechanism 52 interposed therebetween. Therefore, the output-side cam mechanism 52 and the output shaft 40 also rotate in the same direction as the output disc 18 with respect to the central shaft 21. At this time, in the output-side cam mechanism 52, thrust toward the output disc 18 and thrust toward the output shaft 40 are generated in the normal rotation of the input shaft 30. The thrusts are of magnitude according to the torque of the output disc 18. As described above, in such a case, the thrust of the output-side cam mechanism 52, the reaction force of the first reaction force generating portion (the annular portion 32b of the input hub 32), and the reaction force of the second reaction force generating portion (the thrust bearing TB1 and the disc portion 21c of the central shaft 21) push the input disc 17 and the output disc 18 against the respective planetary balls 14.

Moreover, at this time, the first helical gear 61 fitted by the splines also rotates in the same direction as the output shaft 40 rotates. Therefore, by working between the first helical gear 61 and the second helical gear 62 engaged with each other, an axial thrust according to the rotating direction is generated on the first helical gear 61. Because the output shaft 40 rotates in the normal direction in the normal rotation of the input shaft 30, the thrust of the first helical gear 61 acts in such a direction as to push the output disc 18 against the respective planetary balls 14. As described above, at this time, by means of the thrust of the first helical gear 61, the reaction force of the first reaction force generating portion (the annular portion 32b of the input hub 32), and the reaction force of the second reaction force generating portion (the thrust bearing TB1 and the disc portion 21c of the central shaft 21), the input disc 17 and the output disc 18 are pushed against the respective planetary balls 14.

As described above, according to the continuously variable transmission 1 in the first embodiment, in the normal rotation of the input shaft 30, it is possible to push the input disc 17 and the output disc 18 against the respective planetary balls 14 with suitable strength by means of the thrust of the input-side cam mechanism 51, the thrust of the output-side cam mechanism 52, the thrust of the pair of helical gears (the first helical gear 61 and the second helical gear 62), the reaction force of the first reaction force generating portion (the annular portion 32b of the input hub 32), and the reaction force of the second reaction force generating portion (the thrust bearing TB1 and the disc portion 21c of the central shaft 21). The suitable strength is such strength as to generate forces for sandwiching the respective planetary balls 14 between the input disc 17 and the output disc 18 and strong enough at least to obtain a desired transmission torque capacity. As a result, in the continuously variable transmission mechanism 10, desired contact pressure can be generated between the input disc 17 and the output disc 18, and the respective planetary balls 14 and the transmission torque capacity according to the contact pressure can be obtained. Therefore, in the continuously variable transmission 1, the torque input to the input shaft 30 is adjusted to the torque according to the transmission torque capacity and transmitted to the output shaft 40. The transmission torque capacity is set according to the respective thrusts, friction coefficients between the first rotary member 51a and the second rotary member 51b, and the cam rollers 51c and friction coefficients between the first rotary member 52a and the second rotary member 52b, and the cam rollers 52c.

The torque transmitted to the output shaft 40 is, in other words, the torque of the input shaft 30 which is increased or decreased according to the transmission gear ratio of the continuously variable transmission mechanism 10. In the continuously variable transmission mechanism 10, the transmission gear ratio is a ratio according to the tilting angle at which the planetary balls 14 tilt with the support shafts 14a. Therefore, in the continuously variable transmission 1, the respective planetary balls 14 are tilted by axially moving the idler plate 11 for supporting the idler roller 13 for rotation by means of the shift mechanism 20 to thereby continuously vary the transmission gear ratio which is a ratio between the numbers of rotations of the input shaft 30 and the output shaft 40.

In the continuously variable transmission mechanism 10, if the input disc 17 and the output disc 18 have the same radiuses and when the support shafts 14a is parallel to the central shaft 21, the radius (contact radius) at a position where the contact face 17a of the input disc 17 is in contact with the outer peripheral face of each of the planetary balls 14 from the rotation axis X and the radius (contact radius) at a position where the contact face 18a of the output disc 18 is in contact with the outer peripheral face of each of the planetary balls 14 from the rotation axis X become the same and the transmission gear ratio is "1".

Figure 5:
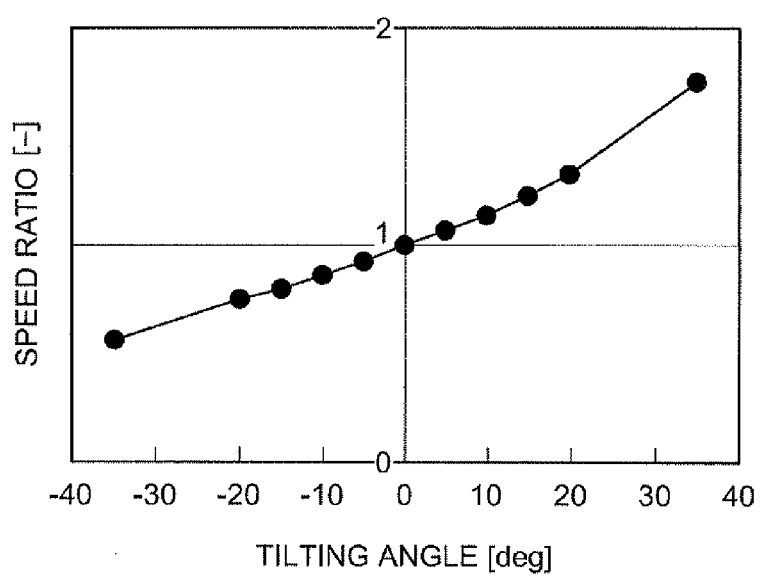
FIG. 5 is a diagram showing a relationship between a tilting angle of planetary balls included in the continuously variable transmission in the first embodiment and a transmission gear ratio (speed ratio).

On the other hand, in the continuously variable transmission mechanism 10, when the support shafts 14a is tilted with respect to the central shaft 21 as a result of operation of the shift mechanism 20, either one of the contact radius between the input disc 17 and each of the planetary balls 14 and the contact radius between the output disc 18 and each of the planetary balls 14 increases according to the tilting angle of each of the planetary balls 14 while the other decreases according to the tilting angle. Therefore, in the continuously variable transmission mechanism 10, the number of rotations of the output disc 18 with respect to the number of rotations of the input disc 17 changes according to the changes of the contact radiuses. Consequently, the transmission gear ratio which is the ratio between these numbers of rotations varies according to the tilting angle as shown in FIG. 5. In FIG. 5, the number of rotations of the output disc 18 when the number of rotations of the input disc 17 is "1" is plotted for each tilting angle and the respective points are connected with a line.

Next, a case in which the output shaft 40 is rotating in the reverse direction as when the torque in the reverse direction is input to the output shaft 40 will be described.

In this case, the output-side cam mechanism 52 and the output disc 18 rotate with the output shaft 40 in the reverse direction with respect to the central shaft 21.

At this time, in the output-side cam mechanism 52, the same thrust as when the input shaft 30 is rotating in the normal direction is generated. Therefore, at this time, by means of the thrust of the output-side cam mechanism 52, the reaction force of the first reaction force generating portion (the annular portion 32b of the input hub 32), and the reaction force of the second reaction force generating portion (the thrust bearing TB1 and the disc portion 21c of the central shaft 21), the input disc 17 and the output disc 18 are pushed against the respective planetary balls 14. Here, the thrust of the output-side cam mechanism 52 is of magnitude according to the torque of the output shaft 40.

Furthermore, during the reverse rotation of the output shaft 40, the first helical gear 61 fitted by the splines also rotates in the same direction as the output shaft 40 rotates. Therefore, by working between the first helical gear 61 and the second helical gear 62 engaged with each other, the thrust in such a direction as to move the output disc 18 away from the respective planetary balls 14 (leftward in the axial direction on the plane of the paper of FIG. 1) is generated on the first helical gear 61.

The thrust of the first helical gear 61 cannot be transmitted to the output shaft 40 through the splines SP as described above but can be transmitted to the snap ring SR. Therefore, in the reverse rotation of the output shaft 40, by means of the thrust of the first helical gear 61 in the reverse direction, the reaction force of the first reaction force generating portion (the annular portion 32b of the input hub 32), and the reaction force of the second reaction force generating portion (the thrust bearing TB1 and the disc portion 21c of the central shaft 21), the input disc 17 and the output disc 18 are pushed against the respective planetary balls 14 as described above.

As a result, the frictional forces are generated between the contact face 18a of the output disc 18 and the outer peripheral faces of the respective planetary balls 14 and therefore, by the frictional forces, the torque is transmitted from the output disc 18 to the respective planetary balls 14.

During the reverse rotation of the output shaft 40, the respective planetary balls 14 are caused to rotate on their axes by the torque transmitted from the output disc 18 and rotate the idler roller 13 about the rotation axis X as they rotate on their axes. The respective planetary balls 14 rotating on their axes are in contact at their outer peripheral faces with the contact face 17a of the input disc 17. As a result, frictional forces are generated at the contact portions and therefore, the torque is transmitted from the respective planetary balls 14 to the input disc 17 by the frictional forces. The input disc 17 is caused to rotate in the same direction as the output shaft 40 and the output disc 18 with respect to the central shaft 21 by the torque from the respective planetary balls 14. As a result, the input-side cam mechanism 51 and the input shaft 30 also rotate in the same direction as the input disc 17 with respect to the central shaft 21.

At this time, in the input-side cam mechanism 51, the same thrust as in the normal rotation of the input shaft 30 is generated. Therefore, at this time, by means of the thrust of the input-side cam mechanism 51, the reaction force of the first reaction force generating portion (the annular portion 32b of the input hub 32), and the reaction force of the second reaction force generating portion (the thrust bearing TB1 and the disc portion 21c of the central shaft 21), the input disc 17 and the output disc 18 are pushed against the respective planetary balls 14.

As described above, according to the continuously variable transmission 1 in the first embodiment, during the reverse rotation of the output shaft 40, it is possible to push the input disc 17 and the output disc 18 against the respective planetary balls 14 with suitable strength by means of the thrust of the input-side cam mechanism 51, the thrust of the output-side cam mechanism 52, the thrust by the pair of helical gears (the first helical gear 61 and the second helical gear 62) in the reverse direction, the reaction force of the first reaction force generating portion (the annular portion 32b of the input hub 32), and the reaction force of the second reaction force generating portion (the thrust bearing TB1 and the disc portion 21c of the central shaft 21). Therefore, in the continuously variable transmission mechanism 10, desired contact pressure can be generated between the input disc 17 and the output disc 18, and the respective planetary balls 14 and a desired transmission torque capacity according to the contact pressure can be obtained. As a result, in the continuously variable transmission 1, the torque input to the output shaft 40 is adjusted to the torque according to the transmission torque capacity and is transmitted to the input shaft 30. In other words, the torque transmitted to the input shaft 30 is obtained by increasing or decreasing the torque input to the output shaft 40 according to the transmission gear ratio of the continuously variable transmission mechanism 10.

Figure 6:
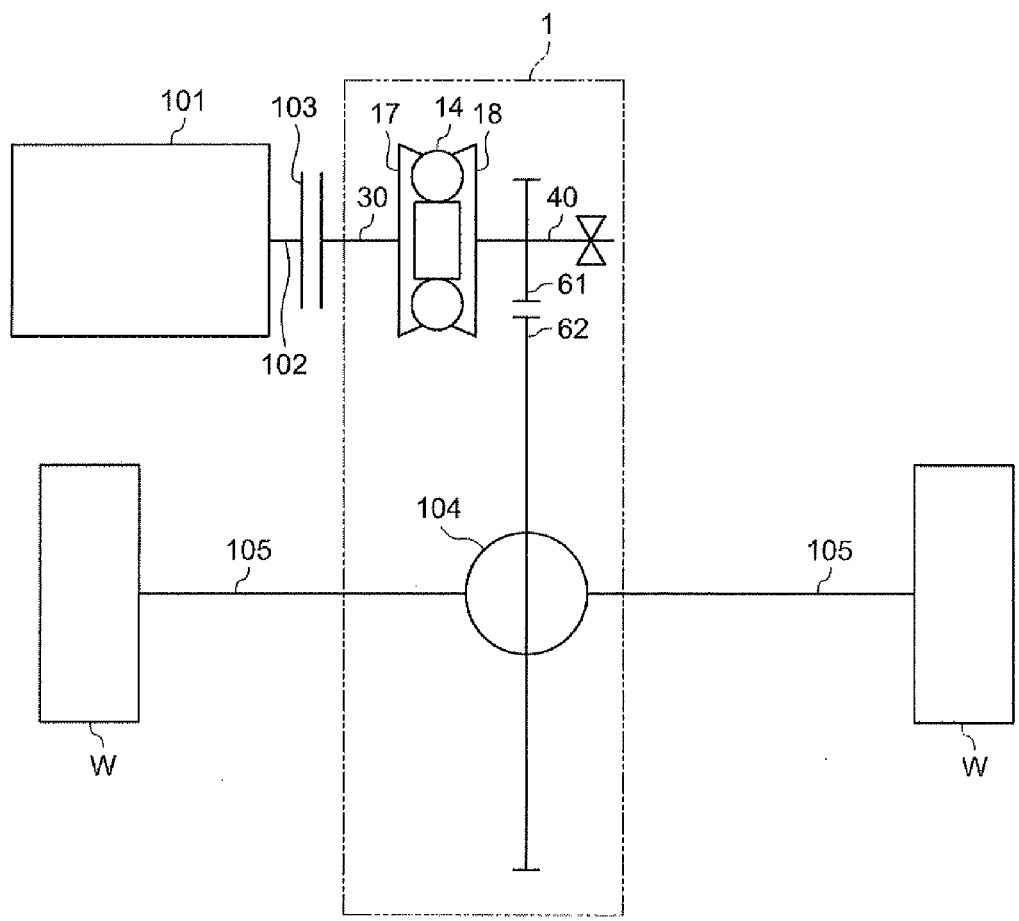
FIG. 6 is a drawing for explaining an example of application of the continuously variable transmission according to the invention to a transmission of a vehicle.

Here, FIG. 6 shows a concrete example of application of the continuously variable transmission 1 in which the torque in the normal direction is input to the input shaft 30 or the torque in the reverse direction is input to the output shaft 40. As the concrete example, it may be applied to a transmission in a vehicle such as an automobile.

For example, in the vehicle, an output shaft 102 of an engine 101 is connected to an input side of a clutch 103, the input shaft 30 of the continuously variable transmission 1 is connected to an output side of the clutch 103, and output torque of the engine 101 is input as torque in the normal direction to the input shaft 30. In this way, as described in the above description of the normal rotation of the input shaft 30, the continuously variable transmission 1 can generate the suitable force for pushing the output disc 18 against the respective planetary balls 14 and the suitable force for pushing the input disc 17 against the respective planetary balls 14 and therefore the output torque of the engine 101 can be adjusted to the torque according to the transmission torque capacity based on the contact pressure at this time and transmitted to the output shaft 40. In this vehicle, the second helical gear 62 is disposed coaxially with a differential gear 104 and therefore, the torque of the output shaft 40 transmitted through the pair of helical gears (the first helical gear 61 and the second helical gear 62) is transmitted to left and right axles 105 and wheels W through the differential gear 104 to carry out forward traveling.

In the vehicle, at the time of deceleration such as a fuel cut of the engine 101, the torque in the reverse direction to that in the forward traveling is input to the pair of helical gears (the first helical gear 61 and the second helical gear 62) through the wheels W, axles 105 and the differential gear 104. In other words, the torque in the reverse direction is input to the output shaft 40 at this time. Therefore, in the continuously variable transmission 1 at this time, it is possible to generate a suitable force for pushing the output disc 18 against the respective planetary balls 14 and a suitable force for pushing the input disc 17 against the respective planetary balls 14 even during the reverse rotation, i.e., when the thrust of the first helical gear 61 acts in the reverse direction to that in the forward traveling as described in the above description of the reverse rotation of the output shaft 40 and therefore it is possible to adjust the torque from the wheels W to torque according to the transmission torque capacity based on the contact pressure at this time to transmit it to the input shaft 30. The torque of the input shaft 30 in the reverse direction is transmitted to the output shaft 102 of the engine 101 through the clutch 103. In this manner, the continuously variable transmission 1 can transmit the torque in the reverse direction from the wheels W to the output shaft 102 of the engine 101 and therefore rotation of the output shaft 102 does not stop in the fuel cut of the engine 101 and the engine 101 can be restarted smoothly. Moreover, because the continuously variable transmission 1 can allow the engine 101 to carry out the fuel cut, it is possible to improve fuel economy. Furthermore, because the continuously variable transmission 1 does not freewheel when the torque in the reverse direction is input from the wheels W to the output shaft 40, i.e., because it can transmit the torque in the reverse direction to the input shaft 30, it is possible to exert what is called engine brake in the vehicle.

Another concrete example may be application to a rotating electric machine having a function (powering function) as a motor for converting electric energy into mechanical energy to output it and a function (regenerating function) as a generator for converting mechanical energy into electric energy, the rotating electric machine incorporating a speed changing function. Described below is an example of application to a motor disposed at least partially inside a wheel member of a wheel of a vehicle, i.e., what is called an in-wheel motor mainly used as a drive source for traveling in a vehicle such as a hybrid vehicle (HV), an electric vehicle (EV), and a fuel cell vehicle (FCV).

Figure 7:
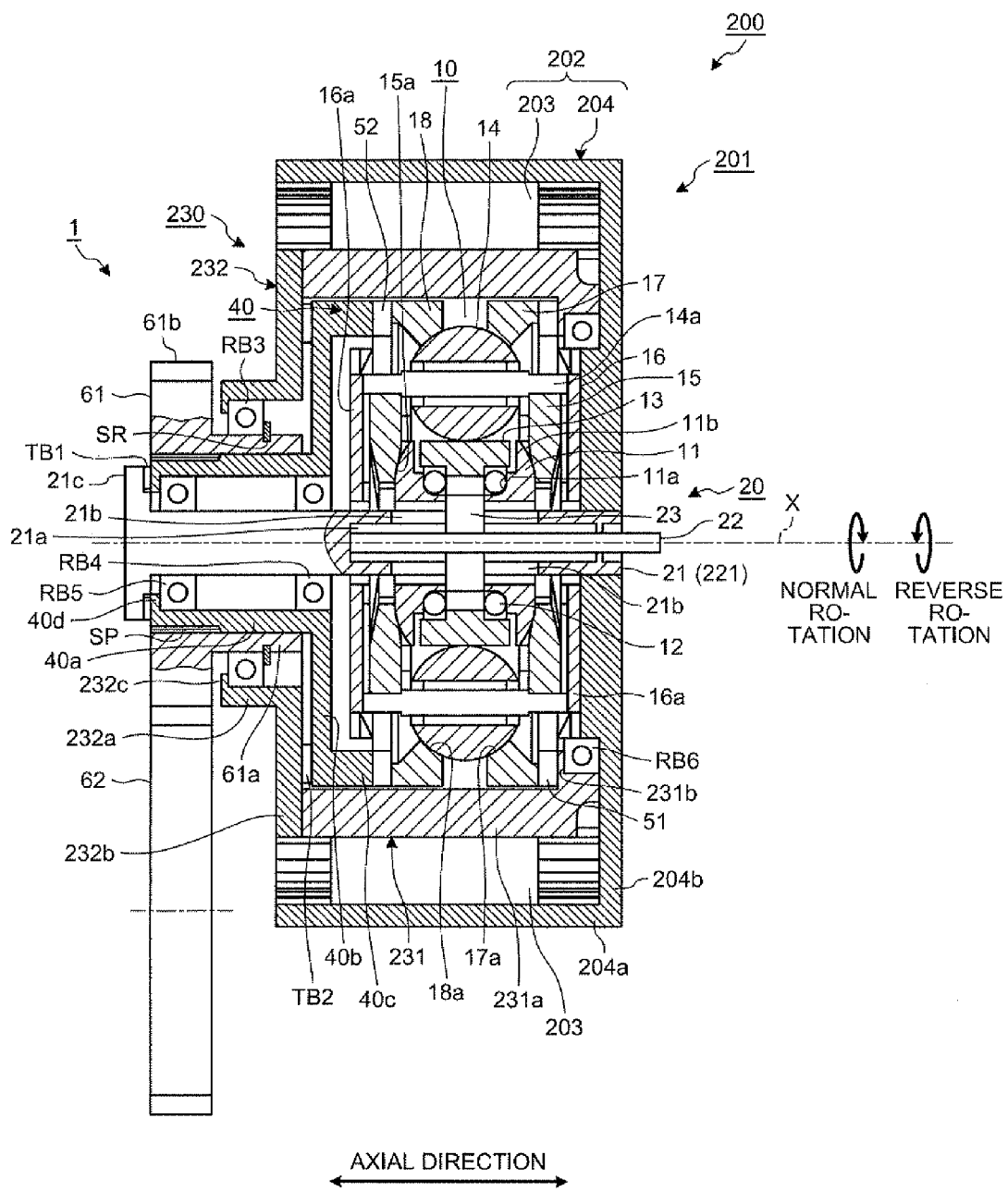
FIG. 7 is a drawing for explaining an example of application of the continuously variable transmission according to the invention to an in-wheel motor.

Reference numeral 200 in FIG. 7 designates the in-wheel motor shown here as an example. In FIG. 7, portions designated by the reference numerals used in the above description are common portions shared with the previous example. Therefore, portions related to different structures from those in the above description will be described here.

The in-wheel motor 200 is disposed so that at least a part of it is positioned on an inner peripheral side of the wheel member of the wheel (not shown) so as to be able to drive the wheel for rotation and includes a motor generator portion 201 which can be actuated as a motor or a generator. The motor generator portion 201 is basically formed as a permanent magnet synchronous motor. The in-wheel motor 200 also includes a speed changing portion for changing a ratio between a rotating speed (the number of rotations) of a rotor and a rotating speed (the number of rotations) of the output shaft 40 of the motor generator portion 201. Here, as the speed changing portion, the continuously variable transmission 1 described above is used. The motor generator portion 201 is formed into a cylindrical shape coaxial with the rotation axis X and the continuously variable transmission 1 is disposed radially inside the motor generator portion 201 to make the device compact.

Here, to apply the continuously variable transmission 1 to the in-wheel motor 200, a part of the continuously variable transmission 1 is changed in the example. To put it concretely, the input shaft 30 in FIG. 1 is replaced with an input shaft 230 shown in FIG. 7 and the input shaft 230 has a function as the rotor of the motor generator portion 201. The input shaft 230 is made up of a rotor 231 having substantially the same shape as the input hub 32 of the input shaft 30 and a support member 232 having the same shape and function as the support member 33 of the input shaft 30. Similarly to the input shaft 30, the rotor 231 and the support member 232 of the input shaft 230 integrally rotate with respect to the central shaft 21.

The rotor 231 includes a cylindrical portion 231a and an annular portion 231b similarly to the input hub 32. In other words, the rotor 231 includes the cylindrical portion 231a having the rotation axis X as its central axis and the flange-like annular portion 231b formed to extend radially inward from one end of the cylindrical portion 231a on the input disc 17 side.

The cylindrical portion 231a is in the same shape as the cylindrical portion 32a of the input hub 32. The cylindrical portion 231a forms a rotor core (rotor iron core) and includes a plurality of permanent magnets (not shown). The respective permanent magnets are provided at equal intervals along the circumferential direction of the cylindrical portion 231a so that the two permanent magnets adjacent to each other in the circumferential direction have different polarities. The rotor 231 may be a magnet-embedded permanent magnet rotor with the plurality of permanent magnets embedded in the cylindrical portion 231a or may be a surface magnet permanent magnet rotor with the plurality of permanent magnets provided on a surface of the cylindrical portion 231a.

As compared with the annular portion 32b of the input hub 32, the annular portion 231b has an annular wall face which is on an opposite side from the input-side cam mechanism 51 and a radially inner portion of which is thinned in the axial direction. A step formed in this way is utilized as a disposing portion of a radial bearing RB6. The rotor 231 is supported at an inner peripheral face of its disposing position on an outer peripheral face of a stepped portion of a disc portion 204b of an outer case 204 (described later) with the radial bearing RB6 interposed therebetween so that the rotor 231 can rotate with respect to the outer case 204. In other words, the radial bearing RB6 has an outer ring fitted with the inner peripheral face of the disposing portion and an inner ring fitted with the outer peripheral face of the stepped portion. Here, the outer case 204 does not rotate with respect to the central shaft 21 (stator shaft 21). Therefore, the input shaft 230 rotates with respect to the central shaft 21 (stator shaft 221) through the radial bearings RB3 and RB6.

The radial bearing RB6 is sandwiched in the axial direction between an annular wall face of the above described disposing portion of the annular portion 231b and a wall face of the stepped portion of the disc portion 204b. The outer case 204 is not allowed to move in the axial direction with respect to the central shaft 21 (stator shaft 221). Therefore, the annular portion 231b functions as the first reaction force generating portion similarly to the annular portion 32b.

The support member 232 has the same shape and function as the support member 33 of the input shaft 30 and has a cylindrical portion 232a, a first annular portion 232b, and a second annular portion 232c. Therefore, the second annular portion 232c performs part of the function of the opposite axial force transmitting portion described above.

The planetary balls 14 may be made of magnetic or non-magnetic material.

The continuously variable transmission 1 in the in-wheel motor 200 can continuously vary the transmission gear ratio which is the ratio between the rotating speed (the number of rotations) of the rotor 231 and the rotating speed (the number of rotations) of the output shaft 40 of the motor generator portion 201. In this way, the in-wheel motor 200 can drive the motor generator portion 201 constantly at the number of rotations for high energy efficiency irrespective of the number of rotations of the wheel.

The motor generator portion 201 has the rotor 231 as a rotor and a stator 202 as a stator in the input shaft 230.

The stator 202 forms a predetermined magnetic field when supplied with electricity. The stator 202 forms a cylindrical shape having the rotation axis X as its central axis and is disposed to cover the rotor 231 from radially outside. To put it concretely, the stator 202 is made up of a stator coil 203 and the outer case 204.

The stator coil 203 is made up of a plurality of coils wound around stator cores (stator iron cores). The respective coils are disposed and fixed at substantially equal intervals onto an inner peripheral face of a cylindrical portion 204a (described later) of the outer case 204 along the circumferential direction. As the stator cores, cores formed by laminating magnetic steel sheets or cores formed of iron-dust cores are used.

The stator coil 203 is electrically connected to a drive controller (not shown) which is a drive ECU of the vehicle through a three-phase cable or the like, for example. For example, to the drive controller, a command value of torque to be output from the in-wheel motor 200 is sent from an integrated controller (not shown) which is an integrated ECU of the vehicle. The drive controller which received the command generates control current necessary for the output of the torque and supplies it to the stator coil 203 through the three-phase cable.

The outer case 204 is a cylindrical member having a bottom portion and shares the central shaft 21 of the continuously variable transmission 1 as the stator shaft 221 and has the cylindrical portion 204a and the disc portion 204b. The cylindrical portion 204a is formed into a cylindrical shape having the rotation axis X as its central axis and a larger inner diameter than an outer diameter of the rotor 231. The cylindrical portion 204a is disposed so that its inner peripheral face covers an outer peripheral face of the rotor 231 and retains the respective coils forming the stator coil 203 between the inner peripheral face and the outer peripheral face. On the other hand, the disc portion 204b is a disc-shaped member having the rotation axis X as its central axis and provided to close an opening at one end of the cylindrical portion 204a on the input disc 17 side. In the outer case 204, the cylindrical portion 204a and the disc portion 204b are integrated with each other so that the disc portion 204b serves as the bottom portion of the cylindrical portion 204a. Moreover, the outer case 204 is fitted at its disc portion 204b over the stator shaft 221 which is a shaft to be fixed to a vehicle body. Here, the stator shaft 221 is in the same shape as the central shaft 21 of the continuously variable transmission 1 and has the shift shaft 22 or the like forming the shift mechanism 20. The shift shaft 22 inserted into the stator shaft 221 protrudes from the disc portion 204b.

The outer case 204 houses the continuously variable transmission 1 in an inner columnar space formed by the cylindrical portion 204a and the disc portion 204b. On a face of the disc portion 204b facing the housed continuously variable transmission 1, the stepped portion for retaining an axial side and a radially inner side of the radial bearing RB6 is formed.

In the motor generator portion 201, the rotor 231 receives magnetism of the magnetic field formed by the stator coil 203 of the stator 202 and is driven to rotate to thereby generate mechanical power, i.e., torque. In the in-wheel motor 200, the torque of the rotor 231 serves as torque of the input shaft 230 and the input shaft 230 rotates in the normal direction to actuate the continuously variable transmission 1 as described above. In other words, the torque of the input shaft 230 is adjusted to torque according to a transmission torque capacity and transmitted to the output shaft 40. Here, the in-wheel motor 200 is mounted to the wheel member with the disc portion 204b side of the outer case 204 facing the vehicle body and a rotation axis of the second helical gear 62 disposed coaxially with the wheel. As a result, the in-wheel motor 200 transmits the torque of the output shaft 40 to the wheel member through the second helical gear 62 to rotate the wheel in the forward traveling direction.

On the other hand, the in-wheel motor 200 rotates the output shaft 40 in the reverse direction in the deceleration of the vehicle. In this case, the continuously variable transmission 1 is actuated in the same manner as in the reverse rotation of the output shaft 40 described above and can adjust the torque of the output shaft 40 to the torque according to the transmission torque capacity to transmit it to the input shaft 230. At this time, the torque transmitted to the input shaft 230 is acting in the reverse direction. Therefore, the in-wheel motor 200 can actuate the motor generator portion 201 as the generator, convert the torque of the rotor 231 into electric power, and store the electric power in a battery (not shown). In other words, the in-wheel motor 200 can regenerate the electric power in the deceleration of the vehicle. Moreover, the torque of the input shaft 230 in the reverse direction generates rotational resistance on the rotor 231 and therefore, in the in-wheel motor 200, motor regenerative torque for braking the reverse rotation is generated on the rotor 231. In other words, the in-wheel motor 200 can brake rotation of rotary members such as the rotor 231, the input disc 17, the planetary balls 14, the output disc 18, and the output shaft 40 by means of the motor regenerative torque which is negative motor torque generated on the rotor 231. Therefore, the vehicle mounted with the in-wheel motor 200 can be braked, because braking force (negative drive force) is generated on a contact face of the wheel with a road surface. In other words, the in-wheel motor 200 can carry out regenerative braking by applying the motor regenerative torque generated by regeneration of the electric power to the wheel to cause the braking force which is the negative drive force to act on the vehicle.

In this manner, the continuously variable transmission 1 can obtain the suitable transmission torque capacity in the reverse rotation of the output shaft 40, adjust the torque of the output shaft 40 to the torque according to the transmission torque capacity, and transmit it to the input shaft 230 and therefore it is possible to achieve the regeneration of the electric power and the regenerative braking in the in-wheel motor 200.

Second Embodiment

A second embodiment of the continuously variable transmission according to the invention will be described based on FIG. 8.

The input-side cam mechanism 51 (FIG. 4) in the first embodiment described above cannot generate a thrust in the axial direction when the input shaft 30 rotates in the reverse direction. Therefore, in the reverse rotation of the input shaft 30, the input disc 17 and the output disc 18 cannot be pushed against the respective planetary balls 14 and the output disc 18 and the output shaft 40 cannot be rotated. As a result, a thrust is not generated in the first helical gear 61 in the reverse rotation of the input shaft 30 and therefore the input disc 17 and the output disc 18 cannot be pushed against the respective planetary balls 14. Therefore, in the continuously variable transmission 1 in the second embodiment, the input-side cam mechanism 51 is replaced with an input-side cam mechanism 151 shown in FIG. 8.

The input-side cam mechanism 151 in the second embodiment generates an axial thrust when the input shaft 30 or the input disc 17 rotates in each of the normal and reverse directions. The input-side cam mechanism 151 includes an annular first rotary member 151a and an annular second rotary member 151b having the rotation axis X as their central axes and disposed to face each other on the rotation axis X and cam rollers 151c sandwiched between opposed faces of the first rotary member 151a and the second rotary member 151b. Here, each of the cam rollers 151c is sandwiched between cam faces 151d respectively formed on the opposed faces of the first rotary member 151a and the second rotary member 151b. Each cam face 151d is inclined so that an axial interval between a standard face and itself gradually widens in the circumferential direction in the normal rotation and is inclined from the largest interval portion so that the interval gradually narrows in the circumferential direction in the normal rotation. In other words, the cam face 151d is in a shape of a valley groove with respect to the standard face.

Here, the first rotary member 151a is disposed to rotate integrally with the annular face of the annular portion 32b of the input hub 32 and the second rotary member 151b is disposed to rotate integrally with a radially outer end portion of the input disc 17. Therefore, if the torque in the normal direction is input to the input shaft 30 or the torque in the reverse direction is input to the input disc 17, the input-side cam mechanism 151 can transmit the torque and generate the axial thrust similarly to the input-side cam mechanism 51 in the first embodiment. On the other hand, if the torque in the reverse direction is input to the input shaft 30 or the torque in the normal direction is input to the input disc 17, the input-side cam mechanism 151 can transmit the torque and generate the axial thrust though its movement is reverse to that in the normal rotation of the input shaft 30 or the reverse rotation of the input disc 17.

Operation of the continuously variable transmission 1 in the second embodiment in the normal rotation of the input shaft 30 (the normal rotation of the output disc 18) is the same as that in the normal rotation of the input shaft 30 in the first embodiment and operation of the continuously variable transmission 1 in the second embodiment in the reverse rotation of the output shaft 40 (the reverse rotation of the input disc 17) is the same as that in the reverse rotation of the output shaft 40 in the first embodiment. Therefore, in the second embodiment, the operation in these cases will not be described.

Operation of the continuously variable transmission 1 when the input shaft 30 is rotating reversely as when the torque in the reverse direction is input to the input shaft 30 will be described.

In this case, the input-side cam mechanism 151 and the input disc 17 rotate together with the input shaft 30 in the reverse direction with respect to the central shaft 21. At this time, the input-side cam mechanism 151 generates a thrust toward the input disc 17 and a thrust toward the annular portion 32b of the input hub 32. A relationship between the thrust toward the input disc 17 and a reaction force of the second reaction force generating portion (the thrust bearing TB1 and the disc portion 21c of the central shaft 21) is the same as that when the input-side cam mechanism 51 is employed and the reaction force bears the thrust. A relationship between the thrust toward the annular portion 32b of the input hub 32 and a reaction force of the first reaction force generating portion (the annular portion 32b of the input hub 32) is the same as that when the input-side cam mechanism 51 is employed and the reaction force bears the thrust. Therefore, in the reverse rotation of the input shaft 30, it is possible to push the input disc 17 and the output disc 18 against the respective planetary balls 14 by means of the thrust of the input-side cam mechanism 151, the reaction force of the first reaction force generating portion (the annular portion 32b of the input hub 32), and the reaction force of the second reaction force generating portion (the thrust bearing TB1 and the disc portion 21c of the central shaft 21). As a result, frictional forces are generated between the contact face 17a of the input disc 17 and the outer peripheral faces of the respective planetary balls 14 in the reverse rotation of the input shaft 30 and therefore, by the frictional forces, the torque is transmitted from the input disc 17 to the respective planetary balls 14. Here, the thrust of the input-side cam mechanism 151 is of magnitude according to the torque of the input shaft 30.

In the reverse rotation of the input shaft 30, the respective planetary balls 14 are caused to rotate on their axes by the torque transmitted from the input disc 17 and the idler roller 13 rotates about the rotation axis X as the planetary balls 14 rotate on their axes. The respective planetary balls 14 rotating on their axes transmit the torque to the output disc 18 by means of frictional forces generated at the contact portions between the outer peripheral faces of the planetary balls 14 and the contact face 18a of the output disc 18. The output disc 18 is caused to rotate in the same direction as the input shaft 30 and the input disc 17 with respect to the central shaft 21 by the torque from the respective planetary balls 14. As a result, the output-side cam mechanism 52 and the output shaft 40 also rotate in the same direction as the output disc 18 with respect to the central shaft 21.

At this time, in the output-side cam mechanism 52, the output disc 18 rotates in the reverse direction and the cam rollers 52c are locked to the respective lock faces 52e of the first rotary member 52a and the second rotary member 52b and therefore they integrally rotate in the reverse direction to rotate the output shaft 40 in the reverse rotation. On the other hand, in the output-side cam mechanism 52 in the reverse rotation of the input shaft 30, the cam rollers 52c cannot be sandwiched between the respective cam faces 52d of the first rotary member 52a and the second rotary member 52b and therefore the axial thrust is not generated.

However, in the reverse rotation of the input shaft 30, the first helical gear 61 fitted by the splines also rotates in the same direction as the output shaft 40 rotates in the reverse direction. Therefore, by working between the first helical gear 61 and the second helical gear 62 engaged with each other, a thrust in such a direction as to move the output disc 18 away from the respective planetary balls 14 (toward the left side of the plane of the paper of FIG. 1 in the axial direction) is generated. Therefore, in the reverse rotation of the input shaft 30, similarly to the reverse rotation of the output shaft 40, the input disc 17 and the output disc 18 can be pushed against the respective planetary balls 14 by means of the thrust of the first helical gear 61, the reaction force of the first reaction force generating portion (the annular portion 32b of the input hub 32), and the reaction force of the second reaction force generating portion (the thrust bearing TB1 and the disc portion 21c of the central shaft 21).

As described above, according to the continuously variable transmission 1 in the second embodiment, in the reverse rotation of the input shaft 30, it is possible to push the input disc 17 and the output disc 18 against the respective planetary balls 14 with suitable strength by means of the thrust of the input-side cam mechanism 151, the thrust of the pair of helical gears (the first helical gear 61 and the second helical gear 62), the reaction force of the first reaction force generating portion (the annular portion 32b of the input hub 32), and the reaction force of the second reaction force generating portion (the thrust bearing TB1 and the disc portion 21c of the central shaft 21). As a result, in the continuously variable transmission mechanism 10, desired contact pressure can be generated between the input disc 17 and the output disc 18, and the respective planetary balls 14 and the transmission torque capacity according to the contact pressure can be obtained. Therefore, in the continuously variable transmission 1, the torque in the reverse direction and input to the input shaft 30 is adjusted to the torque according to the transmission torque capacity and transmitted to the output shaft 40. The transmission torque capacity at this time is set according to the respective thrusts and friction coefficients between the first rotary member 151a and the second rotary member 151b, and the cam rollers 151c. Therefore, here, the input-side cam mechanism 151 and the pair of helical gears may be formed to generate greater thrusts than in the first embodiment to compensate for a decrease in the thrust of the output-side cam mechanism 52.

Next, a case in which the output shaft 40 is rotating in the normal direction as when torque in the normal direction is input to the output shaft 40 will be described.

In this case, the output-side cam mechanism 52 and the output disc 18 rotate together with the output shaft 40 in the normal direction with respect to the central shaft 21. At this time, because the output shaft 40 is rotating in the normal direction, the cam rollers 52c are locked to the respective lock faces 52e of the first rotary member 52a and the second rotary member 52b in the output-side cam mechanism 52. Therefore, the output-side cam mechanism 52 in the normal rotation of the output shaft 40 can rotate the output shaft 40 in the reverse direction in the same manner as in the reverse rotation of the input shaft 30 but cannot generate an axial thrust.

Here, in the normal rotation of the output shaft 40, the first helical gear 61 generates a thrust in such a direction as to push the output disc 18 against the respective planetary balls 14. Therefore, in the normal rotation of the output shaft 40, it is possible to push the input disc 17 and the output disc 18 against the respective planetary balls 14 by means of the thrust of the first helical gear 61, a reaction force of the first reaction force generating portion (the annular portion 32b of the input hub 32), and a reaction force of the second reaction force generating portion (the thrust bearing TB1 and the disc portion 21c of the central shaft 21). As a result, frictional forces are generated between the contact face 18a of the output disc 18 and the outer peripheral faces of the respective planetary balls 14 and therefore, the frictional forces transmit the torque from the output disc 18 to the respective planetary balls 14.

In the normal rotation of the output shaft 40, the respective planetary balls 14 are caused to rotate on their axes by the torque transmitted from the output disc 18 to rotate the idler roller 13 about the rotation axis X as the planetary balls 14 rotate on their axes. The planetary balls 14 rotating on their axes transmit the torque to the input disc 17 by frictional forces generated between the outer peripheral faces of the planetary balls 14 and the contact face 17a of the input disc 17. The input disc 17 is caused to rotate similarly to the output shaft 40 and the output disc 18 in the normal direction with respect to the central shaft 21 by the torque from the respective planetary balls 14. As a result, the input-side cam mechanism 151 and the input shaft 30 also rotate in the same direction as the input disc 17 with respect to the central shaft 21.

At this time, the same thrust as in the normal rotation of the input shaft 30 is generated in the input-side cam mechanism 151 and therefore, it is possible to push the input disc 17 and the output disc 18 against the respective planetary balls 14 by means of the thrust of the input-side cam mechanism 151, the reaction force of the first reaction force generating portion (the annular portion 32b of the input hub 32), and the reaction force of the second reaction force generating portion (the thrust bearing TB1 and the disc portion 21c of the central shaft 21). The thrust is the thrust according to the torque of the input disc 17.

As described above, according to the continuously variable transmission 1 in the second embodiment, in the normal rotation of the output shaft 40, it is possible to push the input disc 17 and the output disc 18 against the respective planetary balls 14 with suitable strength by means of the thrust of the pair of helical gears (the first helical gear 61 and the second helical gear 62), the thrust of the input-side cam mechanism 151, the reaction force of the first reaction force generating portion (the annular portion 32b of the input hub 32), and the reaction force of the second reaction force generating portion (the thrust bearing TB1 and the disc portion 21c of the central shaft 21). As a result, in this case, in the continuously variable transmission mechanism 10, desired contact pressure can be generated between the input disc 17 and the output disc 18, and the respective planetary balls 14 and the transmission torque capacity according to the contact pressure can be obtained. Therefore, in the continuously variable transmission 1, the torque input to the output shaft 40 is adjusted to the torque according to the transmission torque capacity and transmitted to the input shaft 30. The transmission torque capacity at this time is set according to the respective thrusts and friction coefficients between the first rotary member 151a and the second rotary member 151b, and the cam rollers 151c. Therefore, here, the input-side cam mechanism 151 and the pair of helical gears may be formed to generate greater thrusts than in the first embodiment to compensate for a decrease in the thrust of the output-side cam mechanism 52.

Here, in the continuously variable transmission 1 in the second embodiment, the output-side cam mechanism 52 may be replaced with the mechanism having the similar structure to the input-side cam mechanism 151 shown in FIG. 8. An output-side cam mechanism 152 shown in FIG. 8 includes a first rotary member 152a, a second rotary member 152b, cam rollers 152c, and cam faces 152d. Here, the first rotary member 152a is disposed to rotate integrally with a radially outer end portion of the output disc 18 and the second rotary member 152b is disposed to rotate integrally with an annular end face of the second cylindrical portion 40c. Therefore, the output-side cam mechanism 152 can generate an axial thrust when the output shaft 40 or the output disc 18 rotates in each of the normal direction and the reverse direction.

As a result, in the reverse rotation of the input shaft 30 described above or in the normal rotation of the output shaft 40 described above, it is possible to push the input disc 17 and the output disc 18 against the respective planetary balls 14 by means of the thrust of the output-side cam mechanism 152. As a result, the thrust of the output-side cam mechanism 152 is added to the force for pushing the input disc 17 and the output disc 18 against the respective planetary balls 14 and therefore, it is possible to obtain the suitable transmission torque capacity even if the thrusts of the input-side cam mechanism 151 and the pair of helical gears for compensating for the thrust of the output-side cam mechanism 152 are decreased. Consequently, it is possible to reduce loads on the input-side cam mechanism 151 and the pair of helical gears.

According to the continuously variable transmission 1 in the second embodiment, whichever of the input shaft 30 and the output shaft 40 the torque is input to and whether the rotating direction of the torque is the normal or reverse direction, the suitable transmission torque capacity can be obtained and the speed change and transmission of the input torque are possible. In other words, even if the continuously variable transmission 1 has such a structure that the input shaft 30 is used as the output shaft and the output shaft 40 is used as the input shaft, it is possible to appropriately transmit the torque between the input side and the output side. If the input side and the output side are exchanged, the pair of helical gears (the first helical gear 61 and the second helical gear 62) is disposed on the new input side (the output shaft 40 in the above example). In this case, the pair of helical gears (the first helical gear 61 and the second helical gear 62) may be provided on the new output side (the input shaft 30 in the above example) and it is possible to obtain the suitable transmission torque capacity in this way.

Here, in the respective embodiments 1 and 2 described above, the pair of helical gears (the first helical gear 61 and the second helical gear 62) is shown as an example of the axial force generating portion. However, the axial force generating portion is not necessarily limited to the pair of helical gears. For example, as the axial force generating portion, an electric actuator such as an electric motor or a hydraulic actuator that can operate equivalently to the pair of helical gears (the first helical gear 61 and the second helical gear 62) may be used.

The axial force generating portion may be formed to generate the axial force for pushing the output disc 18 toward the input disc 17 and not to generate an opposite force. In this case, the continuously variable transmission 1 preferably has an opposite force generating portion or structure for generating an axial opposite force opposite to the thrust of the axial force generating portion.

INDUSTRIAL APPLICABILITY

As described above, the continuously variable transmission according to the invention includes the input member, the output member, and the rotary members sandwiched therebetween, transmits the torque between the input member and the output member by means of the frictional forces generated by pushing the input member and the output member against the rotary members, continuously varies the transmission gear ratio between the input member and the output member, and is useful as a technique capable of suitably generating the pressing forces in axial opposite directions between the input member and the output member.

REFERENCE SIGNS LIST

1 CONTINUOUSLY VARIABLE TRANSMISSION
10 CONTINUOUSLY VARIABLE TRANSMISSION MECHANISM
14 PLANETARY BALL
17 INPUT DISK
18 OUTPUT DISK
20 SHIFT MECHANISM
21 CENTRAL SHAFT
21c DISC PORTION
30 INPUT SHAFT
32 INPUT HUB
32b ANNULAR PORTION
33 SUPPROT MEMBER
33c SECOND ANNULAR PORTION
40 OUTPUT SHAFT
40d SECOND ANNULAR PORTION
51, 151 INPUT-SIDE CAM MECHANISM
52, 152 OUTPUT-SIDE CAM MECHANISM
61 FIRST HELICAL GEAR
62 SECOND HELICAL GEAR
221 STATOR SHAFT
RB1, RB2, RB3, RB4, RB5, RB6 RADIAL BEARING
SP SPLINE
SR SNAP RING
TB1, TB2 THRUST BEARING
X ROTATION AXIS

The invention claimed is:

1. A continuously variable transmission comprising:
a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member;
an axial force generating portion which rotates in one direction to generate a first axial force for pushing one of the input member and the output member toward the other and rotates in the other direction to generate a second axial force opposite to the first force instead of the first axial force; and
an opposite axial force transmitting portion that transmits the second force to the other of the input member and the output member and pushes the other of the input member and the output member toward the one of the input member and the output member when the axial force generating portion generates the second force.

2. The continuously variable transmission according to claim 1 further comprising:
a first reaction force generating portion in charge of a reaction force of the first force for pushing the output member toward the input member;
a second reaction force generating portion in charge of a reaction force of the second force for pushing the input member toward the output member; and
a torque output portion capable of rotating with respect to a central shaft which is a center of rotation of respective rotary elements, giving and receiving torque and an axial force to and from the output member, and transmitting the torque of the output member to an outside,
wherein the first reaction force generating portion is disposed not to move in the axial direction with respect to the central shaft and formed of a torque input portion capable of giving and receiving torque and an axial force to and from the input member and transmitting torque from outside to the input member and
the second reaction force generating portion is formed of a wall face portion of the central shaft provided to an end portion of the torque output portion on an opposite side from the output member in the axial direction and a member disposed between the end portion of the torque output portion and the wall face portion of the central shaft to allow the torque output portion to rotate with respect to the central shaft and not to allow the torque output portion to axially move with respect to the central shaft.

3. The continuously variable transmission according to claim 1, wherein the axial force generating portion is a pair of helical gears engaged with each other.

4. A continuously variable transmission comprising:
a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member;
an axial force generating portion capable of generating a first axial force for pushing one of the input member and the output member toward the other and
an opposite axial force transmitting portion that transmits a second force to the other of the input member and the output member and pushes the other of the input member and the output member toward the one of the input member and the output member when the second axial force in an opposite direction to the first force is generated instead of the first axial force on a side of the one of the input member and the output member, the second axial force being a force in a direction as to move the one of the input member and the output member away from the other.

5. The continuously variable transmission according to claim 4, wherein the axial force generating portion can generate the second force as well as the first force.

6. The continuously variable transmission according to claim 4, wherein the axial force generating portion rotates in one direction to generate the first force and rotates in the other direction to generate the second force.

7. The continuously variable transmission according to claim 4, wherein the axial force generating portion is a pair of helical gears engaged with each other.

* * * * *